(12) United States Patent
Zinevich

(10) Patent No.: US 11,290,761 B2
(45) Date of Patent: *Mar. 29, 2022

(54) DETECTION OF CPD FROM SIGNALS CAPTURED AT REMOTE PHY DEVICE

(71) Applicant: ARCOM DIGITAL PATENT, LLC, Syracuse, NY (US)

(72) Inventor: Victor M. Zinevich, Voronezh (RU)

(73) Assignee: Arcom Digital Patent, LLC, Syracuse, NY (US)

(*) Notice: Subject to any disclaimer, the term of this patent is extended or adjusted under 35 U.S.C. 154(b) by 76 days.

This patent is subject to a terminal disclaimer.

(21) Appl. No.: 16/809,671

(22) Filed: Mar. 5, 2020

(65) Prior Publication Data

US 2020/0204843 A1 Jun. 25, 2020

Related U.S. Application Data

(63) Continuation of application No. 16/125,837, filed on Sep. 10, 2018, now Pat. No. 10,616,622.
(Continued)

(51) Int. Cl.
*G01R 31/08* (2020.01)
*G06F 11/00* (2006.01)
(Continued)

(52) U.S. Cl.
CPC ......... *H04N 21/2402* (2013.01); *H04L 43/04* (2013.01); *H04L 43/50* (2013.01); *H04N 21/615* (2013.01); *H04L 12/2801* (2013.01)

(58) Field of Classification Search
CPC .. H04N 21/2402; H04N 21/615; H04L 43/04; H04L 43/50; H04L 12/2801;
(Continued)

(56) References Cited

U.S. PATENT DOCUMENTS 6,417,942 B1 7/2002 Seto et al.
6,425,132 B1 7/2002 Chappell
(Continued)

FOREIGN PATENT DOCUMENTS

WO WO2000057571 A1 9/2000
WO WO2012009757 A1 1/2012
(Continued)

OTHER PUBLICATIONS

Corrected Notice of Allowability, dated Feb. 3, 2020, in U.S. Appl. No. 16/125,837 (parent to instant application), filed Sep. 10, 2018, entitled Detection of CPD from Signals Captured at Remote PHY Device, now U.S. Pat. No. 10,616,622 on Apr. 7, 2020 (listed above), PDF pp. 1-14.
(Continued)

*Primary Examiner* — Stephen M D Agosta
(74) *Attorney, Agent, or Firm* — Harris Beach PLLC

(57) ABSTRACT

A method of detecting CPD in an HFC network that includes a remote PHY device (RPD) is disclosed. The RPD includes a transmitter, receiver, and diplexer having forward and return legs. The receiver receives a return signal from a cable plant via the return leg. The transmitter provides a forward signal to the cable plant via the forward leg. A portion of the forward signal leaks through the return leg and travels to the receiver. The return signal contains a CPD signal generated by the forward signal and a CPD source in the cable plant. The forward signal propagates from RPD to CPD source and CPD signal propagates from CPD source to RPD within a round-trip interval. The method comprises: (a) adjusting the capturing bandwidth of the receiver to include return and leaked forward signals; (b) operating receiver to capture return and leaked forward signals over a limited duration of at least the round-trip interval; and (c) detecting CPD signal by processing captured leaked forward and return signals.

21 Claims, 13 Drawing Sheets

Related U.S. Application Data

(60) Provisional application No. 62/683,417, filed on Jun. 11, 2018, provisional application No. 62/681,188, filed on Jun. 6, 2018.

(51) Int. Cl.

| | | |
|---|---|---|
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04N 21/24* | (2011.01) | |
| *H04N 21/61* | (2011.01) | |
| *H04L 43/50* | (2022.01) | |
| *H04L 43/04* | (2022.01) | |
| *H04L 12/28* | (2006.01) | |

(58) Field of Classification Search
CPC ....... H04W 24/08; H04H 20/12; H04H 20/78; H04J 14/0221; H04J 14/08; H04J 3/0667; H04J 3/0673; H04M 3/10; H04M 3/306
See application file for complete search history.

(56) References Cited

U.S. PATENT DOCUMENTS

| | | | |
|---|---|---|---|
| 6,570,394 | B1 | 5/2003 | Williams |
| 6,687,632 | B1 | 2/2004 | Rittman |
| 6,895,043 | B1 | 5/2005 | Naegeli et al. |
| 6,934,655 | B2 | 8/2005 | Jones et al. |
| 6,990,682 | B1 | 1/2006 | Sato et al. |
| 7,024,680 | B2 | 4/2006 | Howard |
| 7,069,163 | B2 | 6/2006 | Gunther et al. |
| 7,334,253 | B2 | 2/2008 | Howard |
| 7,415,367 | B2 | 8/2008 | Williams |
| 7,584,496 | B2 | 9/2009 | Zinevich |
| 7,788,050 | B2 | 8/2010 | Williams |
| 7,978,735 | B2 | 7/2011 | Ezra et al. |
| 8,458,759 | B2 | 6/2013 | Zinevich |
| 8,548,760 | B2 | 10/2013 | Chappell |
| 8,649,421 | B2 | 2/2014 | Renken et al. |
| 8,861,620 | B2 | 10/2014 | Toosi et al. |
| 8,879,669 | B2 | 11/2014 | Massey |
| 9,100,339 | B1 | 8/2015 | Hamzeh |
| 9,203,658 | B2 | 12/2015 | Toosi et al. |
| 9,203,664 | B2 | 12/2015 | Currivan et al. |
| 9,209,863 | B2 | 12/2015 | Williams et al. |
| 9,225,387 | B2 | 12/2015 | Williams et al. |
| 9,264,101 | B2 | 2/2016 | Currivan et al. |
| 9,414,126 | B1 | 8/2016 | Zinevich |
| 9,531,562 | B2 | 12/2016 | Currivan et al. |
| 9,634,722 | B2 | 4/2017 | Gray et al. |
| 9,826,263 | B2 | 11/2017 | Zinevich |
| 9,838,679 | B2 | 12/2017 | Harris et al. |
| 9,960,842 | B2 | 5/2018 | Zinevich |
| 10,158,423 | B2 | 12/2018 | Zinevich |
| 10,616,622 | B2 | 4/2020 | Zinevich |
| 2002/0086641 | A1 | 7/2002 | Howard |
| 2002/0094785 | A1 | 7/2002 | Deats |
| 2003/0181185 | A1 | 9/2003 | Lusky et al. |
| 2003/0182664 | A1 | 9/2003 | Lusky et al. |
| 2004/0073937 | A1 | 4/2004 | Williams |
| 2004/0203392 | A1 | 10/2004 | Hsu et al. |
| 2004/0245995 | A1 | 12/2004 | Williams |
| 2005/0029807 | A1 | 2/2005 | Montena |
| 2005/0233702 | A1 | 10/2005 | Ferguson |
| 2006/0248564 | A1 | 11/2006 | Zinevich |
| 2008/0039045 | A1 | 2/2008 | Filipovic et al. |
| 2008/0320541 | A1 | 12/2008 | Zinevich |
| 2011/0194418 | A1 | 8/2011 | Wolcott et al. |
| 2013/0125183 | A1 | 5/2013 | Gomez et al. |
| 2014/0036975 | A1 | 2/2014 | Wolcott et al. |
| 2014/0133330 | A1 | 5/2014 | Chapman |
| 2014/0241409 | A1 | 8/2014 | Wolcott et al. |
| 2014/0254392 | A1 | 9/2014 | Wolcott et al. |
| 2014/0294052 | A1 | 10/2014 | Currivan et al. |
| 2015/0020128 | A1 | 1/2015 | Maxon et al. |
| 2015/0052572 | A1 | 2/2015 | Schemmann |
| 2015/0078194 | A1 | 3/2015 | Currivan et al. |
| 2015/0229416 | A1 | 8/2015 | Williams |
| 2015/0295684 | A1 | 10/2015 | Jin et al. |
| 2016/0028496 | A1 | 1/2016 | Currivan et al. |
| 2016/0057479 | A1 | 2/2016 | Bush et al. |
| 2016/0112214 | A1 | 4/2016 | Currivan et al. |
| 2016/0112734 | A1 | 4/2016 | Williams et al. |
| 2017/0179981 | A1* | 6/2017 | Williams ................ H04B 1/30 |
| 2017/0353750 | A1 | 12/2017 | Gotwals et al. |
| 2018/0048352 | A1* | 2/2018 | Liu ..................... G01R 31/088 |
| 2018/0219621 | A1 | 8/2018 | Zinevich |
| 2019/0379921 | A1 | 12/2019 | Zinevich |

FOREIGN PATENT DOCUMENTS

| | | |
|---|---|---|
| WO | WO2016065094 A1 | 4/2016 |
| WO | WO2017066036 A1 | 4/2017 |
| WO | WO2019236245 A1 | 12/2019 |

OTHER PUBLICATIONS

Notice of Allowability, dated Nov. 20, 2019, in U.S. Appl. No. 16/125,837 (parent to instant application), filed Sep. 10, 2018, entitled Detection of CPD from Signals Captured at Remote PHY Device, now U.S. Pat. No. 10,616,622 on Apr. 7, 2020 (listed above), PDF pp. 1-17.

European Patent Office, International Search Report in PCT Application No. PCT/US2019/031959 (counterpart to parent of instant application), filed May 13, 2019 (pub. WO2019236245—cited above), entitled Detection of CPD from Signals Captured at Remote PHY Device, date of ISR Jul. 12, 2019, pp. 1-4, published by World Intellectual Property Organization (WIPO), Geneva, CH. (Provided in parent U.S. Appl. No. 16/125,837, filed Sep. 10, 2018).

European Patent Office, Written Opinion of International Searching Authority, in PCT Application No. PCT/US2019/031959 (counterpart to parent of instant application), filed May 13, 2019 (pub. WO2019236245—cited above), entitled Detection of CPD from Signals Captured at Remote PHY Device, date of Written Opinion Jul. 12, 2019, pp. 1-7, published by WIPO, Geneva, CH (Provided in parent U.S. Appl. No. 16/125,837, filed Sep. 10, 2018).

Cable Television Laboratories, Inc. (Cablelabs®), entitled Data-Over-Cable Service Interface Specifications DOCSIS® 3.1, CCAP™ Operations Support System Interface Specification, CM-SP-CCAP-OSSIv3.1-I11-171220, Dec. 20, 2017, pp. 48-57, 64-66, 257-258, 417-431, 473-481, 558-559, 597, 680-688, CABLELABS®, Louisville, CO (Provided in parent U.S. Appl. No. 16/125,837, filed Sep. 10, 2018).

Cable Television Laboratories, Inc. (Cablelabs®), entitled "Data-Over-Cable Service Interface Specifications, DOCSIS® 3.1, Physical Layer Specification, CM-SP-PHYv3.1-I13-171220," Dec. 20, 2017, pp. 15, Figs. 2-3, 25, 40, 200-210, 264-70 (& Section 9), entire document, CABLELABS®, Louisville, CO. (See also citations in Corrected Notice of Allowability (cited above), PDF p. 4) (Provided in parent U.S. Appl. No. 16/125,837, filed Sep. 10, 2018).

Cable Television Laboratories, Inc. (Cablelabs®), entitled Data-Over-Cable Service Interface Specs. DOCSIS® 3.1 Physical Layer Specification, CM-SP-PHYv3.1-I10-170111, Jan. 11, 2017, pp. 1-248 (and Sec. 9), CABLELABS®, Louisville, CO. Earlier version of #6 ref. above. (Provided in parent U.S. Appl. No. 16/125,837, filed Sep. 10, 2018).

Cable Television Laboratories, Inc. (Cablelabs®), entitled "DOCSIS® Best Practices and Guidelines, PNM Best Practices: HFC Networks (DOCSIS 3.0), CM-GL-PNMP-V03-160725," Jul. 25, 2016, pp. 15-117 (AppendixI-1), CABLELABS®, Louisville, CO, http://www.cablelabs.com/specification/proactive-network-maintenance-using-pre-equalization/ (Provided in parent U.S. Appl. No. 16/125,837, filed Sep. 10, 2018).

Cable Television Laboratories, Inc. (Cablelabs®), entitled Data-Over-Cable Service Interface Specs., DCA-MHAv2, Remote Out-

(56) References Cited

OTHER PUBLICATIONS of-Band Specification, CM-SP-R-OOB-I06-170524, May 24, 2017, pp. 1-64; Sections 5, 7, 7.2, Appendix I, and Appendix II, Cablelabs®, Louisville, CO (Provided in parent U.S. Appl. No. 16/125,837, filed Sep. 10, 2018).
Cable Television Laboratories, Inc. (Cablelabs®), entitled Data-Over-Cable Service Interface Specifications, DOCSIS Set-top Gateway (DSG) Interface Specification, CM-SP-DSG-I24-130808, Aug. 8, 2013, pp. 1-190, Sections 4 & 5, CABLELABS®, Louisville, CO (Provided in parent U.S. Appl. No. 16/125,837, filed Sep. 10, 2018).
Cable Television Laboratories, Inc. (Cablelabs®), entitled Data-Over-Cable Service Interface Specifications, DCA-MHAv2 Remote PHY Specification, CM-SP-R-PHY-I05-160923, Sep. 23, 2016, pp. 22-25, Figs. 1-3, p. 180 (Appendix I, at Sec. I.2, Hardware Module in the Node), CABLELABS®, Louisville, CO (See also citations in Corrected Notice of Allowability (cited above), PDF pp. 3-4) (Provided in parent U.S. Appl. No. 16/125,837, filed Sep. 10, 2018).
Cable Television Laboratories, Inc. (Cablelabs®), entitled Data-Over-Cable Service Interface Specs. DOCSIS® 3.1, CCAP™ Operations Support System Interface Spec., CM-SP-CCAP-OSSIv3.1-I07-160602, Jun. 2, 2016, pp. 51-60, 68-69, 267, 480-488, 569, 604, 680-686, & 691, CABLELABS®, Louisville, CO (Provided in parent U.S. Appl. No. 16/125,837, filed Sep. 10, 2018).
Broadcom Webpage BCM3047, DOCSIS® 3.1 and Video Cable Head-end Transmitter, Jun. 2016, pp. 1-3, Broadcom Inc., San Jose, CA (Provided in parent U.S. Appl. No. 16/125,837, filed Sep. 10, 2018).
BROADCOM Webpage BCM31442, Dual Port DOCSIS® 3.1 Burst Receiver, Jun. 2016, pp. 1-3, Broadcom Inc., San Jose, CA (Provided in parent U.S. Appl. No. 16/125,837, filed Sep. 10, 2018).
Harmonic Inc. Webpage—Remote PHY Node CableOS Ripple-1, A Compact and Cost-Effective Node for Remote PHY Deployments, Sep. 26, 2016, pp. 1-3, Harmonic Inc., San Jose, CA (Provided in parent U.S. Appl. No. 16/125,837, filed Sep. 10, 2018).
Hitron Technologies Inc., CMS-02 Embedded Spectrum Analysis Module DOCSIS 3.0 Datasheet, May 2016, pp. 1-2, Hitron Technologies Inc., Centennial, CO. (Provided in parent U.S. Appl. No. 16/125,837, filed Sep. 10, 2018).
Walsh, Jim and Parikh, Samir How Complex Changes Coming to Cable can Make Technicians' Lives Simpler, a Technical Paper Prepared for the Society of Cable Telecommunications Engineers (SCTE), Oct. 13, 2015, pp. 1-22 (Figs. 1-12) SCTE Cable-Tec EXPO'15, New Orleans, LA (Provided in parent U.S. Appl. No. 16/125,837, filed Sep. 10, 2018).

Cable Television Laboratories, Inc. (Cablelabs®), U.S. Appl. No. 62/054,529, filed Sep. 24, 2014, Williams et al., benefit of which is claimed in 20160112734 (cited above), PDF document pp. 31-32 (Provided in parent U.S. Appl. No. 16/125,837, filed Sep. 10, 2018).
John T. Chapman, Remote PHY for Converged DOCSIS, Video, and OOB, White Paper, Sep. 2014, pp. 1-19, Cisco Systems, Inc., San Jose, CA (Provided in parent U.S. Appl. No. 16/125,837, filed Sep. 10, 2018).
Campos, Alberto, Andreoli-Fang, Jennifer & Ganti, Vivek, Cable Network Management Infrastructure Evolution Apr. 2014, pp. 1-19, Cable Television Laboratories, Inc., Louisville, CO (Provided in parent U.S. Appl. No. 16/125,837, filed Sep. 10, 2018).
John T. Chapman, DOCSIS Remote PHY, Modular Headend Architecture (MHAv2), a Technical Paper Prepared for the Society of Cable Telecommunications Engineers (SCTE), Oct. 21, 2013, pp. 1-21, SCTE Cable-Tec EXPO'13, Atlanta, GA (Provided in parent U.S. Appl. No. 16/125,837, filed Sep. 10, 2018).
Campos, Alberto, Hamzeh, Belal & Williams, Thomas, Testing for Nonlinear Distortion in Cable Networks, Oct. 2013, pp. 4-16, & p. 5 (distortion and 2nd/3rd order undesired energy (nonlinear distortion) in band), Cable Television Laboratories, Inc. (Cablelabs®), Louisville, CO. See also citations in Corrected Notice of Allowability (cited above), PDF p. 4) (Provided in parent U.S. Appl. No. 16/125,837, filed Sep. 10, 2018).
Williams, Thomas, Hamzeh, Belal & Hranac, Ron, Field Measurements of Nonlinear Distortion in Digital Cable Plants, Jan. 2013, pp. 1-10, Cable Television Laboratories, Inc., Louisville, CO (Provided in parent U.S. Appl. No. 16/125,837, filed Sep. 10, 2018).
Agilent Technologies, Inc., Agilent Time Domain Analysis Using a Network Analyzer, Appl'n. Note 1287-12, May 2, 2012, p. 18-35 & 39-40, also Sections 1, 1.1 & 1.2, 2.1 thru 2.4 (fault location), Agilent Technologies, Inc. (now Keysight Technologies, Inc.), Santa Rosa, CA. (See also citations in Corrected Notice of Allowability (cited above), PDF p. 4) (Provided in parent U.S. Appl. No. 16/125,837, filed Sep. 10, 2018).
Xilinx Spartan-3A FPGA Family: Data Sheet, Aug. 19, 2010, pp. 1-132, Xilinx, Inc., San Jose, CA (Provided in parent U.S. Appl. No. 16/125,837, filed Sep. 10, 2018).
Patel, Bharat (Barry), Report on Common Path Distortions or Characterization of CPDs, Feb. 3, 1998, pp. 1-2, 5-9, 16-18, 22-23, 27-28; also, pp. 2-4 (Origins of CPD), Fig. 4, pp. 5-8 (CPD at Oxford), Figs. 8-9 & 10-12, pp. 27-28 (Conclusion), SCTE (See citations in Corrected Notice of Allow. (cited above), PDF p. 4) (Provided in parent U.S. Appl. No. 16/125,837, filed Sep. 10, 2018).

\* cited by examiner

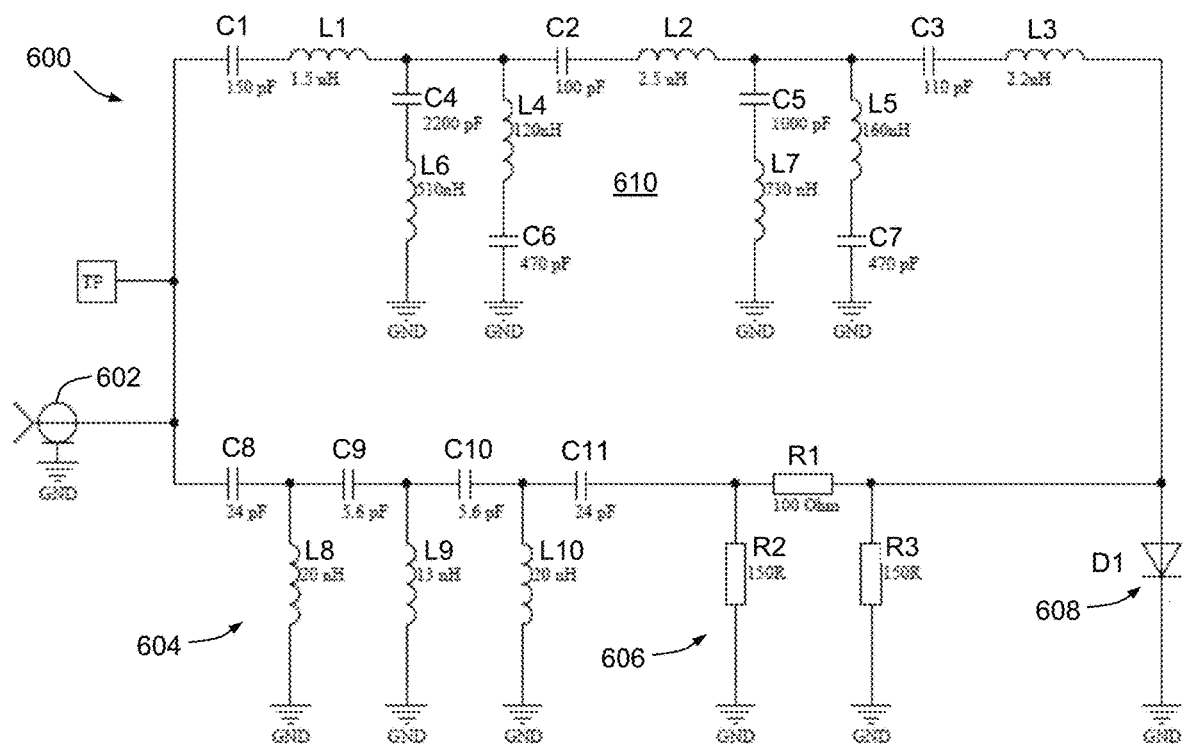
FIG. 6
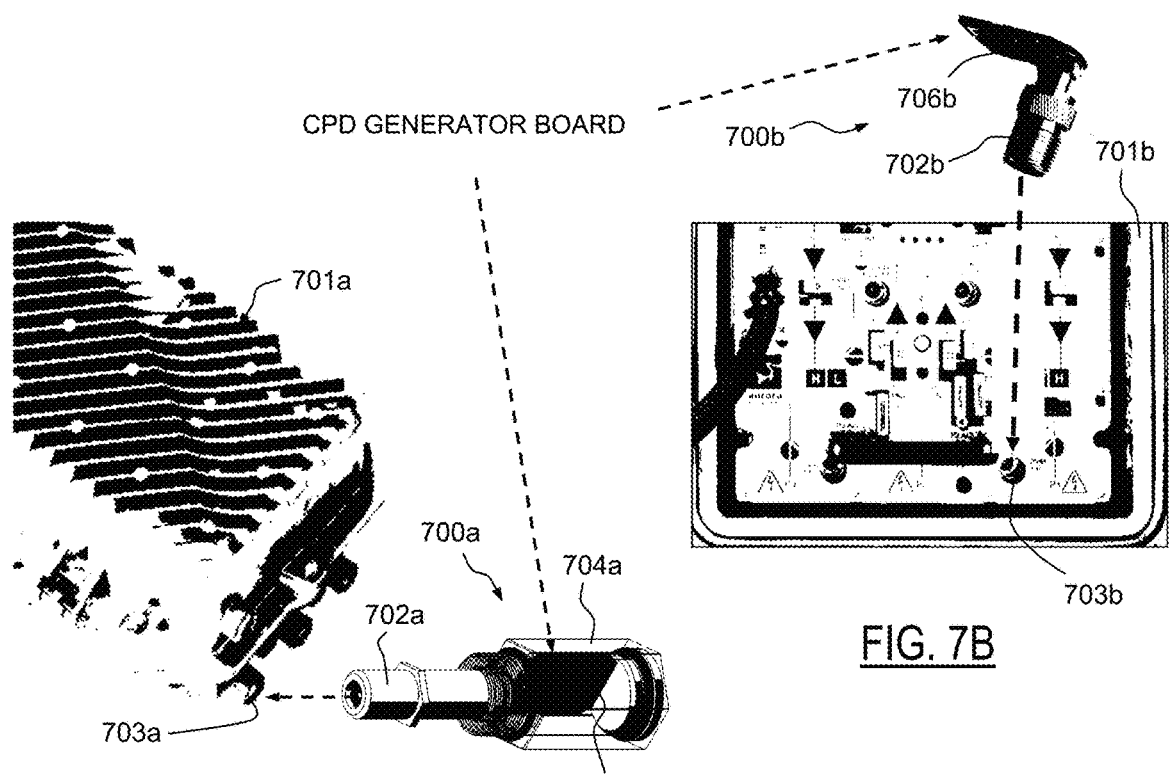
FIG. 7A
FIG. 7B

ACCUMULATION TIME 50 ms:

ACCUMULATION TIME 800 ms:

BEFORE CANCELLATION OF MAIN PEAK:

AFTER CANCELLATION OF MAIN PEAK:

DETECTION OF CPD FROM SIGNALS CAPTURED AT REMOTE PHY DEVICE

CROSS-REFERENCE TO RELATED APPLICATIONS

This application is a continuation of U.S. application Ser. No. 16/125,837, filed Sep. 10, 2018, which claims the benefit of: U.S. Provisional Application No. 62/681,188, filed Jun. 6, 2018, which is incorporated herein by reference; and U.S. Provisional Application No. 62/683,417, filed Jun. 11, 2018, which is incorporated herein by reference. This application is related in subject matter to co-pending application Ser. No. 15/795,362, filed Oct. 27, 2017, naming the same inventor, and is incorporated herein by reference.

BACKGROUND OF THE INVENTION

Field of Invention

The present invention relates generally to the detection of impairments in coaxial cable plants of hybrid-fiber coax (HFC) communication networks employing remote physical layer (PHY) devices, for example, in a Converged Cable Access Platform (CCAP) architecture, and more particularly to apparatus and methods that aid in the detection of common path distortion (CPD) in the coaxial cable plants of such networks.

Background Art

One type of impairment in an HFC network is common path distortion (CPD). This impairment is nonlinear and involves the intermodulation (IM) of downstream or forward path (or "forward") signals occurring at various network components or elements in the "common path" of the network, such as amplifiers, subscriber taps, connectors, contacts, terminations, etc. The IM of the forward signals is the result of a so-called "diode effect" caused by, e.g., corrosion of the above-mentioned components and elements in the network. Such components and elements may also exhibit nonlinear behavior from mechanisms other than corrosion, such as, e.g., ferrite materials, oil films and other contaminants, thin insulators, mutual contact of different metals, or actual diodes elements. A very good explanation of the causes of CPD is found in an article by Bharat (Barry) Patel, entitled, "Common Path Distortions Explained," dated Feb. 3, 1998, pp. 1-29. CPD are intermodulation products of the forward signals in the upstream or return path spectrum of the HFC network. CPD amounts to noise that can adversely impact data transmission in the return path. Accordingly, the task of finding and eliminating sources of CPD is a goal to ensure quality of data and other services in the upstream or return path (or "return"). A component or element (or an affected part thereof) exhibiting nonlinear behavior (or a nonlinear response) is sometimes referred to herein as a "CPD source" or "source of CPD."

In recently specified and implemented HFC networks, the CPD impairment problem is expected to become more difficult to solve due to several factors. First, under the Data-Over-Cable Service Interface Specifications DOCSIS® 3.1, Physical Layer Specification, CM-SP-PHYv3.1-I13-171220, published by Cable Television Laboratories, Inc. (CableLabs®), Dec. 20, 2017, which is incorporated herein by reference (hereinafter "DOCSIS 3.1 Specification"), the bandwidth of the forward spectrum in HFC networks could increase up to 1794 MHz. With increases in bandwidth, the total energy of the forward signal will also increase, and, as result, the level of CPD in the return spectrum will also increase. Second, there is a migration away from analog channels to all digital channels in the forward spectrum. In the case of analog channels, CPD generally appears as discrete harmonics spaced 6 MHz apart and is thus relatively easy to detect, while, in the case of QAM or other digitally modulated signals, CPD appears as flat noise spread over the full return spectrum, making it more difficult to detect. Third, under the most recent DOCSIS 3.1 Specification, the bandwidth of the return spectrum in HFC networks will increase up to 685 MHz by implementation of Full Duplex (FDX) technology. With these increases in bandwidth, the number of different order nonlinear IM products generated at a CPD source will increase, which may impact data signals at least in the return spectrum of FDX. See further discussion of these issues in provisional application No. 62/618,246, filed Jan. 17, 2018.

Methods of detecting CPD have been developed over the years. One such method is to use a spectrum analyzer to monitor the return spectrum for IM products caused by CPD. Such a method is adequate for legacy HFC networks carrying a large number of analog channels. In these networks, CPD looks like a number of discrete 6 MHz harmonics (for NTSC frequency plan). But, in the case of an all-digital network (e.g., QAM and/or OFDM signals), CPD in the return spectrum looks like flat noise and is not easily distinguishable from additive ingress noise. Another limitation is that a spectrum analyzer does not allow one to identify multiple sources of CPD, which is not an uncommon impairment scenario. Also, a CPD source cannot be directly located using a spectrum analyzer. Further, a spectrum analyzer is unable to detect very low level CPD distortion products. The ability to detect very low level CPD is desirable because it allows one to identify CPD sources early in their development, before they impact signal quality, thus making it possible to implement a proactive network maintenance (PNM) program. Also, very low level CPD detection is useful to identify CPD sources that may impact signal quality intermittently (which is a common occurrence). In latter case, low level CPD may increase dramatically for a moment due to mechanical (e.g., wind), temperature, moisture and other environmental factors.

Another known method of detecting CPD is known as the Hunter® Xcor® system available from Arcom Digital, LLC, Syracuse, N.Y. (www.arcomlabs.com). This system is described in the following patent documents: U.S. Pat. No. 7,584,496 to Zinevich and U.S. Pat. No. 7,415,367 to Williams, both of which are incorporated herein by reference. The idea behind this system is to use cross-correlation detection, where a reference CPD signal is generated at a headend (or in the field) from a forward signal and then cross-correlated with an actual CPD (echo) signal received from the coaxial cable plant of an HFC network. Advantages of this system are its ability to detect low level CPD signals and multiple CPD signals at different locations, due to good sensitivity and time delay resolution. This technology is now widely used in HFC networks across the United States and in many other countries. It has proven to be very effective in the early detection and location of CPD sources, which is important for a PNM program.

In a modern HFC network with CCAP and remote PHY architectures, the forward and return signals will be generated and received directly in the field by remote PHY devices. Thus, both forward and return signals will not be physically accessible at the headend of the network, which can limit the usefulness of the Hunter® Xcor® system. The following industry specifications have been prepared for CCAP and Remote PHY architectures: Data-Over-Cable Service Interface Specifications DOCSIS® 3.1, CCAP™ Operations Support System Interface Specification, CM-SP-CCAP-OSSIv3.1-I07-160602 (Jun. 2, 2016); and Data-Over-Cable Service Interface Specifications, DCA-MHAv2 Remote PHY Specification, CM-SP-R-PHY-I05-160923 (Sep. 23, 2016). Both specifications are incorporated herein by reference.

A method and system of CPD detection in a CCAP architecture has been proposed using synchronous capture of a forward OFDM symbol and time-domain samples of an actual return CPD signal. Here, a reference CPD signal is generated from samples of the captured OFDM symbol. These samples are then cross-correlated with samples of the actual return CPD signal. This method is disclosed in U.S. Pat. No. 9,826,263 to Zinevich. To achieve good detection sensitivity (or processing gain) with this method, a relatively large amount of data over a relatively long period of time must be captured. For example, the accumulation time at the cross-correlation detector is about 100 milliseconds or more for detection of CPD under the noise floor. This means that at least 5000 OFDM symbols should be captured. The symbols are captured at a CCAP core (see CCAP specification), which has a capture rate of about 10 or less OFDM symbols per second. Thus, the total time required for capturing 5000 symbols is about 8-10 minutes and the total size of the captured data (OFDM symbols) will be about 160 MB. And, the size of the CPD signal data will be many times more due to the large sampling rate of return signals (around 400 MHz). As a result, the total size of captured data for CPD detection at one node will be around 1 GB, which is still a large amount of data to handle. Another concern with this method/system is that the capturing of I and Q samples of the return signal must be triggered or synchronized with the capture of the forward symbols. Such a trigger or synchronization mechanism may not be available in CCAP networks in accordance with DOCSIS specifications (i.e., it is not required). Thus, there is no guarantee that sync capture of I and Q samples will be possible in a CCAP/Remote PHY platform.

The use of test equipment modules contained within host network devices, such as bi-directional amplifiers, legacy fiber nodes, Remote PHY nodes, or other remote PHY devices, have been proposed. Such modules are referred to in the Remote PHY Specification CM-SP-R-PHY-I05-160923 (cited above), in Appendix I, at Section I.2, Hardware Module in the Node (p. 180). There, it is stated that: "Test equipment vendors may develop modules that will be deployed within a node that supports the R-PHY architecture that performs the same function as the equipment that was previously deployed in the headend. Since the module is located in the R-PHY Node, the same telemetry and control channels can be used." A commercially available module of this type (intended for amplifier enclosures) is a Hitron CMS-02 Embedded Spectrum Analysis Module, supplied by Hitron Technologies Americas Inc., Centennial, CO. (www.hitron-americas.com/product/cms-02). This and similar modules utilize a DOCSIS-compliant cable modem (CM) for communicating (or "backhauling") measurement data to a PNM server. CM operation requires a sizable amount of power from the host device (e.g., remote PHY node). Also, such DOCSIS modems are costly. Finally, a test equipment module using a CM has a relatively large size and thus occupies a relatively large space within a host device. Thus, the deployment of such test equipment modules poses significant challenges.

Accordingly, a need exists in a modern HFC network for a convenient and reliable way to achieve synchronous capture of forward signals and actual CPD echo signals from remote PHY devices in a CCAP architecture (for use in detecting CPD and locating CPD sources). The approach should be compatible with most if not all remote PHY devices, have minimal impact on such devices, and should not require large amounts of captured data for detection and ranging.

OBJECTS AND SUMMARY OF THE INVENTION

It is therefore an object of the present invention to overcome the problems and limitations associated with the prior art and to fulfill the aforementioned need.

It is another object of the present invention to provide apparatus and methods that achieve synchronous capture of forward and return signals at a remote PHY device, for the purpose of detecting CPD and locating its source(s).

It is a further object of the present invention to provide apparatus and methods that achieve synchronous capture of the forward and return signals at a remote PHY device, without modifying or otherwise impacting the remote PHY device.

It is still another object of the present invention to provide apparatus and methods for synchronous capture of forward and return signals (for CPD detection) that are compatible with most if not all remote PHY devices.

It is still a further object of the present invention to provide apparatus and methods for synchronous capture of forward and return signals (for CPD detection) that do not require any or significant power consumption.

It is yet another object of the present invention to provide apparatus and methods for synchronous capture of forward and return signals (for CPD detection) that do not generate large amounts of captured data for CPD detection and ranging.

It is yet a further object of the present invention to provide apparatus and methods for synchronous capture of forward and return signals (for CPD detection) that utilize an existing return channel of the remote PHY device for communicating forward and return captured data to a CPD detection core or server.

It is still yet a further object of the present invention to provide apparatus and methods for synchronous capture of forward and return signals (for CPD detection) that communicate captured data to a CPD detection core or server without the use of a cable modem.

These and other objects are attained in accordance with the present invention, wherein there is provided, in one embodiment, an apparatus for enabling synchronous capture of a forward signal and a related actual CPD signal at a remote PHY device, for the purpose of detecting CPD and locating its source. The remote PHY device is coupled to and delivers the forward signal to a coaxial cable plant. The actual CPD signal is generated by an interaction between the forward signal and a CPD source in the coaxial cable plant. The forward signal propagates from the remote PHY device to the CPD source and the actual CPD signal propagates from the CPD source to the remote PHY device all within a round-trip interval. The actual CPD signal is captured in the remote PHY device in a return channel during the round-trip interval. The apparatus comprises a coupling element, a CPD simulator circuit, and a filter. The coupling element is coupleable to the remote PHY device for capturing the forward signal from the remote PHY device during the round-trip interval. The CPD simulator circuit is coupled to the coupling element and generates from the forward signal a simulated CPD signal having a multiplicity of frequency components. The multiplicity of frequency components includes frequency components within the return channel. The filter substantially selects from the multiplicity of frequency components the frequency components within the return channel, to produce a reference CPD signal. The filter is further coupled to the coupling element to supply the reference CPD signal to the remote PHY device. The reference CPD signal is received by the remote PHY device within the return channel. Accordingly, the reference and actual CPD signals are available from the return channel for use in detecting the actual CPD signal and locating its source in the coaxial cable plant.

In more specific embodiments, the filter may includes or be a bandpass filter having a passband that substantially matches the return channel. The return channel is preferably an out-of-band return channel, such as a narrowband digital return (NDR) channel (further discussion below). The CPD simulator circuit may include or be a Schottky diode or, in a powered embodiment, a field effect transistor. The coupling element may include a cable connector configured to connect to a complementary connector associated with the remote PHY device. The apparatus may further include a highpass filter coupled between the coupling element and the CPD simulator circuit. In such case, the highpass filter has a passband and a reject band separated by a cutoff frequency, where the passband substantially passes the forward signal to the CPD simulator circuit and the reject band substantially rejects frequencies of the simulated CPD signal lower than the cutoff frequency. The apparatus may further include an attenuator circuit coupled between the highpass filter and the CPD simulator circuit. The attenuator circuit is designed to attenuate the level of the forward signal as it travels to the CPD simulator circuit and also attenuates a portion of the simulated CPD signal that travels back towards the highpass filter. The reference CPD signal, as received by the remote PHY device, preferably has a signal level in a range of about 0 dB to about 5 dB relative to an expected maximum level of the actual CPD signal captured by the remote PHY device. The entire apparatus is preferably enclosed in a housing having a cable connector configured to physically and electrically connect to a complementary connector associated with the remote PHY device.

In another embodiment, the apparatus is an active device and, in addition to the above passive elements, further comprises a pulse modulation circuit and a time delay line (e.g., a digital time delay circuit). In this embodiment, the pulse modulation circuit is coupled to the bandpass filter for shaping the reference CPD signal into a pulse. The time delay line is coupled to the pulse modulation circuit. The delay line delays the pulse sufficiently enough such that the actual CPD signal is captured in the remote PHY device without substantial interference from the CPD reference signal. Preferably, the time delay line is configured to delay the pulse longer than the round-trip interval.

In a further embodiment, the apparatus is an active device and, in addition to the original passive elements, further comprises a pulse modulation circuit and a phase inverter circuit (e.g., an analog transformer). Again, the pulse modulation circuit is coupled to the bandpass filter. The pulse modulation circuit shapes the reference CPD signal into a first pulse and shapes a second reference CPD signal (produced by the filter) into a second pulse. The phase inverter circuit is coupled to the pulse modulation circuit. The phase inverter circuit shifts the phase of the second pulse by 180 degrees. Interference caused by an autocorrelation of the first pulse, in detecting the actual CPD signal, is substantially cancelable by interference caused by an autocorrelation of the second pulse (as will be described below).

Also within the scope of the present invention is a method of enabling synchronous capture of a forward signal and a related actual CPD signal, at a remote PHY device, for the purpose of detecting CPD and locating its source. The remote PHY device is coupled to and delivers the forward signal to a coaxial cable plant of an HFC network. The actual CPD signal is generated by an interaction between the forward signal and a CPD source in the coaxial cable plant. The forward signal propagates from the remote PHY device to the CPD source and the actual CPD signal propagates from the CPD source to the remote PHY device, all within a round-trip interval. The method comprises the steps of: (a) capturing the forward signal from an output port associated with the remote PHY device during the round-trip interval; (b) generating from the forward signal captured in step (a) a reference CPD signal, which substantially simulates the actual CPD signal; (c) supplying the reference CPD signal to the remote PHY device; (d) in the remote PHY device, receiving the reference CPD signal in a return channel; and (e) in the remote PHY device, capturing the actual CPD signal in the return channel during the round-trip interval. As a result of these method steps, the reference and the actual CPD signals are processed as a combined return signal in detecting the actual CPD signal and locating the CPD source.

In more specific embodiments, step (a) may include capturing the forward signal from the remote PHY device substantially at the beginning of the round-trip interval. Step (e) may include capturing the actual CPD signal substantially at the end of the round-trip interval. Step (c) may include supplying the reference CPD signal to the remote PHY device via the output port. Where the return channel in the remote PHY device is defined by a noise floor, step (d) may include receiving the reference CPD signal in the Remote PHY device at a level of about 10 dB to about 20 dB above the noise floor.

The method of the present invention may further include steps involving the detection of the CPD and the location of its sources. It is understood that the remote PHY device is coupled to a headend of the HFC network. The method may further comprise the steps of: (f) transmitting the combined return signal from the remote PHY device to the headend of the HFC network; (g) at the headend or a device communicating with the headend, performing a cross-correlation of the reference and the actual CPD signals of the combined return signal, to produce a correlation peak having a time delay corresponding to the round-trip interval; (h) detecting the actual CPD signal from the correlation peak; and (i) determining a location of the CPD source in the coaxial cable plant from the time delay of the correlation peak. In a more specific and preferred method, step (g) includes performing an autocorrelation of the combined return signal to obtain the cross-correlation of the reference and the actual CPD signals. More specifically, the autocorrelation of the combined return signal includes an autocorrelation of the reference CPD signal and the cross-correlation of the reference and the actual CPD signals. The method may involve the further step of substantially subtracting the autocorrelation of the reference CPD signal from the autocorrelation of the combined return signal. In a preferred implementation, the combined return signal has a duration of about 100 milliseconds or greater (or 800 milliseconds or greater), and step (g) above includes performing the autocorrelation of the combined return signal substantially over the duration of the combined return signal.

In another embodiment, and in addition to method steps (a) through (e) above, the method may further comprise the steps of: (f) performing a first combined autocorrelation of the combined return signal, which includes a first reference autocorrelation of the reference CPD signal and a first cross-correlation of the reference and the actual CPD signals; (g) repeating steps (a) and (b) to generate a second reference CPD signal, which substantially simulates a second actual CPD signal; (h) shifting the phase of the second reference CPD signal by about 180 degrees; (i) repeating steps (c) through (e) with respect to the second reference CPD signal (phase-shifted 180 degrees) and with respect to the second actual CPD signal, to produce a second combined return signal; (j) repeating step (f) with respect to the second combined signal, to produce a second combined autocorrelation of the second combined return signal, which includes a second reference autocorrelation of the second reference CPD signal and a second cross-correlation of the second reference and the second actual CPD signals; (k) subtracting the second combined autocorrelation from the first combined autocorrelation, such that the first and the second reference autocorrelations substantially cancel each other out, and the first and the second cross-correlations substantially add together to produce an accumulated cross-correlation function having a correlation peak; and (l) detecting the presence of actual CPD signals in the coaxial cable plant from the correlation peak. The correlation peak has associated therewith a time delay corresponding to the round-trip interval. The method further comprises the step of: (m) determining a location of the CPD source in the coaxial cable plant from the time delay associated with the correlation peak. In a more specific implementation, step (b) may include shaping the reference CPD signal into a first pulse and step (g) may include shaping the second reference CPD signal into a second pulse.

In a further embodiment, and in addition to original method steps (a) through (e) above, the method may further comprise the steps of: (f) shaping the reference CPD signal into a pulse; and (g) delaying the pulse such that the actual CPD signal is captured in the remote PHY device without substantial interference from the CPD reference signal. In a more specific implementation, step (g) may include delaying the pulse longer than the round-trip interval.

In still another embodiment, there is provided a method of synchronous capture of a forward signal and a related actual CPD signal at a remote PHY device, for the purpose of detecting CPD and locating its source. The remote PHY device is coupled between a headend and a coaxial cable plant of an HFC network and includes a forward signal transmitter, a return signal receiver, and a diplexer having forward and return legs. A physical forward path is defined between the forward signal transmitter and the forward leg, and a physical return path is defined between the return signal receiver and the return leg. The forward signal transmitter transmits the forward signal to the coaxial cable plant via the physical forward path and the forward leg of the diplexer. A portion of the forward signal leaks through the return leg of the diplexer and travels over the physical return path to the return signal receiver. The actual CPD signal is generated by an interaction between the forward signal and a CPD source in the coaxial cable plant. The forward signal propagates from the remote PHY device to the CPD source and the actual CPD signal propagates from the CPD source to the remote PHY device all within a round-trip interval.

The method here comprises the steps of: (a) operating the return signal receiver of the remote PHY device to capture the actual CPD signal and the leaked portion of the forward signal over a duration of at least the round-trip interval; (b) transmitting the actual CPD signal and the leaked portion of the forward signal captured in step (a) to the headend of the HFC network; (c) at the headend or a device communicating with the headend, generating from the leaked portion of the forward signal a reference CPD signal, which substantially simulates the actual CPD signal; (d) performing a cross-correlation of the reference and the actual CPD signals to produce a correlation peak having a time delay corresponding to the round-trip interval; (e) detecting the actual CPD signal from the correlation peak; and (f) determining a location of the CPD source in the coaxial cable plant, relative to the remote PHY device, from the time delay of the correlation peak. Note, the diplexer is a combining and splitting network (e.g., such as an impedance bridge, a signal splitter, or diplex filter).

The forward signal is generally defined by a forward signal spectrum. In a more specific embodiment of the latter method, a further step includes: (g) configuring the return signal receiver of the remote PHY device to capture a range of frequencies of the forward signal spectrum. In a more specific embodiment, the return signal receiver has a capturing bandwidth, and step (g) includes adjusting the capturing bandwidth to maximize the range of frequencies to be captured from the forward signal spectrum. In a variation of the latter, the return signal receiver has a capturing bandwidth centered at a center frequency, and step (g) includes setting the center frequency of the capturing bandwidth to maximize the range of frequencies to be captured from the forward signal spectrum.

BRIEF DESCRIPTION OF THE DRAWING

Further objects of the present invention will become apparent from the following description of preferred embodiment with reference to the accompanying drawing, in which:

FIG. 6 is a schematic diagram of the passive, analog CPD generator of FIG. 4;

FIGS. 7A and 7B are views of two physical forms of the CPD generator of FIG. 6, where FIG. 7A shows a housing equipped with a cable connector and enclosing a circuit board which contains the CPD generator circuitry, and FIG. 7B shows the circuit board without a housing and equipped with a connector to connect to an internal test port of a remote PHY device;

FIG. 10A shows an accumulation time of 50 milliseconds and FIG. 10B shows an accumulation time of 800 milliseconds;

DETAILED DESCRIPTION OF THE PREFERRED EMBODIMENT

Figure 1:
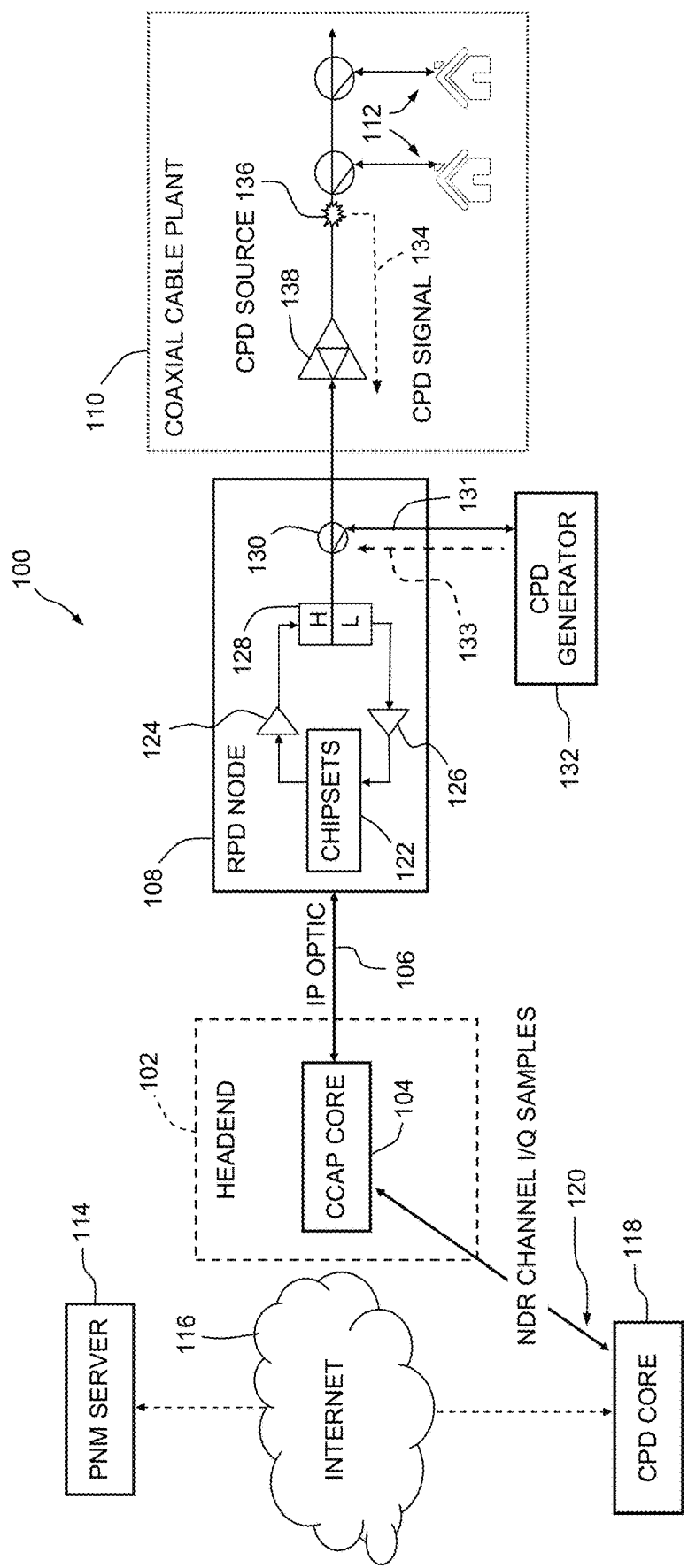
FIG. 1 is a block diagram of an HFC network system with CCAP and remote PHY device architecture, incorporating the present invention.

Referring to FIG. 1, a block diagram is shown of a modern HFC network system 100, constructed in accordance with CCAP and Remote PHY architectures and specifications. Network system 100 comprises a headend 102 which includes a CCAP core 104. System 100 further comprises a digital fiber optic cable plant 106, at least one remote PHY device or node 108, a coaxial cable plant 110, and a number of subscriber networks 112. Remote PHY device 108 is coupled at one end to fiber optic cable plant 106 and at the other end to coaxial cable plant 110. CCAP core 104 contains a cable modem termination system (CMTS) core (not shown) for DOCSIS data communication and an Edge QAM core (not shown) for video. Downstream DOCSIS, MPEG video, and out-of-band (OOB) signals are transmitted from CCAP core 104 to remote PHY node 108 via fiber cable plant 106, in the form of Ethernet or PON digital (IP) signals. Remote PHY node 108 converts these downstream signals to analog RF (radio frequency) signals for transmission to coaxial cable plant 110 and subscriber networks 112. Cable modems (CMs) (not shown) in the subscriber networks 112 transmit upstream or return DOCSIS and OOB analog signals to remote PHY node 108 via coaxial cable plant 110. Remote PHY node 108 converts the upstream DOCSIS and OOB analog signals to digital format (Ethernet or PON) for transmission to CCAP core 104 via fiber plant 106. Remote PHY node 108 is configured as an integrated optical node and a remote PHY device (see, e.g., Section 5 of Remote PHY Specification, cited in Background).

The term "downstream signal" or "forward signal" means signal(s) traveling in a downstream direction in network system 100 (e.g., from CCAP core 104 to coaxial cable plant 110) and located in a downstream or forward frequency spectrum. Similarly, the term "upstream signal" or "return signal" means signal(s) traveling in an upstream direction in network system 100 (e.g., from coaxial cable plant 110 to CCAP core 104) and located in an upstream or return frequency spectrum. In North American cable systems, the legacy downstream frequency band is from just below 54 MHz to as high as 1002 MHz or more. The DOCSIS 3.1 downstream band is 258 MHz (optional 108 MHz) to 1218 MHz (optional 1794 MHz). The legacy upstream frequency band is from 5 MHz to as high as 42 MHz. The DOCSIS 3.1 upstream band is 5 to 204 MHz, with support for 5 to 42 MHz, 5 to 65 MHz, 5 to 85 MHz and 5 to 117 MHz. See CableLabs® Data-Over-Cable Service Interface Specifications DOCSIS® 3.1, Physical Layer Specification, CM-SP-PHYV3.1-I10-170111 (Jan. 11, 2017), incorporated herein by reference (hereafter "DOCSIS 3.1 Specification")

In FIG. 1, a PNM (proactive network maintenance) server 114 is a part of or linked to headend 102. PNM server 114 is a network management system primarily concerned with network maintenance. Its functions include monitoring, measuring, testing, trouble-shooting, identifying, locating, etc. with respect to: signals in network system 100; network components and devices operating in system 100; and impairments in system 100. PNM server 114 stores and executes software routines and communicates with CCAP core 104 (and CMTS core) and the CMs in subscriber networks 112, to instruct these devices to carryout maintenance functions and produce maintenance or test data. PNM server 114 communicates directly or indirectly with CCAP core 104 (or generally with network system 100) via a virtual private network (or virtual local area network), a wide area network (e.g., the Internet), and/or other suitable network link 116. Further details regarding PNM server functions and communication is provided in the DOCSIS 3.1 Specification (Section 9) and an industry guide published by CableLabs®, called PNM Best Practices: HFC Networks (DOCSIS 3.0), CM-GL-PNMP-V03-160725 (Jul. 25, 2016), incorporated herein by reference.

Again referring to FIG. 1, a CPD core 118 is a part of or linked to headend 102. CPD core 118 is a monitoring system especially adapted to implement elements or steps of the present invention. Specifically, in the preferred embodiment, core 118 carries out the functions of CPD detection and location via correlation processing (as described further below). CPD core 118 communicates with and may, in some implementations, be slave to PNM server 114. As shown, CPD core 118 communicates with PNM server 114 via wide area network 116. In other architectures, CPD core 118 may communicate with server 114 via a virtual private network or virtual local area network. CPD core 118 communicates with CCAP core 104 via an IP communication link 120, using, e.g., simple network management protocol (SNMP). CPD core 118 is preferably implemented in software, which may be installed and operated, e.g., on a dedicated CPD core server, on PNM server 114, or in CCAP core 104.

Again referring to FIG. 1, remote PHY node 108 contains a chipset unit 122 (ASIC or FPGA), a forward amplifier 124, a return amplifier 126, a diplex filter 128, and a tap 130 containing an output test port 131. Chipset unit 122 contains chipsets that include downstream QAM modulators, upstream QAM demodulators, and logic to connect and communicate with CCAP core 104. A downstream or forward signal produced in chipset unit 122 is amplified by forward amp 124, passes through a highpass filter leg of diplex filter 128, passes through tap 130, exits node 108 at an RF output port, and then travels to coaxial cable plant 110. Upstream or return signals from subscriber networks 112 travel up through plant 110 and are received by node 108. The return signals pass through a lowpass filter leg of diplex filter 128, are amplified by return amp 126, received by chipset unit 122 for demodulation and down-conversion, and then communicated to CCAP core 104 via digital fiber optic cable 106. The general purpose of test port 131 is to measure and calibrate the level of the forward signal. Chipset unit 122 may include model BCM3047 downstream modulator chipset and model BCM31442 advanced DOCSIS® 3.1 cable network burst receiver chipset, both manufactured by Broadcom Inc., San Jose, Calif. ("Broadcom").

Again referring to FIG. 1, a CPD generator 132, constructed in accordance with the present invention, is coupled to remote PHY node 108 at test port 131. Port 131 is an output test port having an intrinsic attenuation of 20 dB; thus, a sampling of the forward signal from node 108 is available at port 131, reduced in level by 20 dB. CPD generator 132 is configured to receive and receives the forward signal from port 131. Using the forward signal, generator 132 generates a CPD signal that simulates an actual CPD signal generated in cable plant 110. CPD generator 132 also, according to the present invention, limits the band of the simulated CPD signal to a particular return channel used by remote PHY node 108, cable plant 110, and subscriber networks 112. This band-limited, simulated CPD signal is referred to herein as a "reference CPD signal"— reference CPD signal 133 in FIG. 1. As shown in FIG. 1, CPD generator 132 supplies reference CPD signal 133 to node 108 via port 131, tap 130, the lowpass filter leg of diplex filter 128, return amp 126, and to chipset unit 122. Chipset unit 122 receives reference CPD signal 133 in the return channel. Preferably, the return channel is an industry standard out-of-band (OOB) return channel, and more preferably, the return channel is a narrowband digital return (NDR) channel defined under DOCSIS specifications. Further details of CPD generator 132 and its operation are provided below.

Again with respect to FIG. 1, the forward signal is delivered to coaxial cable plant 110 from remote PHY node 108. An actual CPD signal (or CPD echo or CPD echo signal) 134 is generated in cable plant 110 by an interaction between of the forward signal and a CPD source 136 (the so-called "diode effect;" see Background). Because of the nonlinearity of CPD source 136, intermodulation products of the forward signal are generated at source 136, and the lower frequency intermodulation (IM) products travel upstream (as shown by dotted-line arrow). These lower frequency IM products collectively constitute the actual CPD (echo) signal 134, which has frequencies extending across the whole upstream/return spectrum (including the return channel, e.g., OOB return channel). Thus, CPD signal 134 can potentially raise the noise floor and interfere with normal upstream service signals or traffic. CPD signal 134 travels through bi-directional amplifier 138 and is ultimately received by remote PHY node 108. Signal 134 continues through tap 130, the lowpass filter leg of diplex filter 128, return amp 126, and to chipset unit 122. Chipset unit 122 captures the frequency components of CPD signal 134 that are within the return (OOB) channel, for CPD detection and location processing. For the purposes of CPD detection and location, the portion of actual CPD signal 134 within the return channel is simply referred to as the actual CPD signal 134. Note that reference CPD signal 133 (from CPD generator 132) and actual CPD signal 134 are both received or captured by chipset unit 122 within the return channel (the same frequency channel).

The forward signal propagates from remote PHY node 108 to CPD source 136 and CPD signal 134 propagates from CPD source 136 to remote PHY node 108, all within a round-trip propagation interval (or "round-trip interval"). Synchronous capture of the forward signal and CPD signal 134 is defined as the capture of both signals occurring within the round-trip interval. The forward signal is captured and reference CPD signal 133 is generated and supplied to remote PHY node 108 (chipset unit 122) at the beginning of the round-trip interval. Actual CPD signal 134 is captured by remote PHY node 108 (chipset unit 122) at the end of the round-trip interval. The time relationship (or synchronization) between reference CPD signal 133 and actual CPD signal 134 is preserved, because both signals are received (or captured) in chipset unit 122 in the same return channel. Thus, timestamps for each signal are not required to preserve synchronization between the two signals. The terms "capture" and "captured" mean receive and received, respectively. These terms are used, for the most part, when specifically referring to synchronous capture of the forward signal and actual CPD signal 134.

Chipset unit 122 is configured to receive signals of the return channel. Chipset unit 122 includes digital in-phase (I) and quadrature (Q) down-converters for converting signals received from the return channel to I and Q baseband signal samples. These I/Q baseband samples are then transmitted or streamed to CCAP core 104 over fiber cable 106, in the form of Ethernet or PON digital (IP) signals. An aspect and advantage of the preferred embodiments of the present invention is to utilize an existing return channel for which chipset unit 122 is designed, to receive certain signals from subscriber networks 112. Thus, chipset unit 122 (or any part of node 108) does not have to be specially configured to carryout the present invention. As indicated earlier, reference and actual CPD signals 133, 134 are received or captured by chipset unit 122 in the return channel. At chipset unit 122, reference CPD signal 133 will have a zero time delay and actual CPD signal 134 will have a relative time delay of about the round-trip interval. These signals—treated as a combined return signal—are down-converted to I/Q baseband signal samples and transmitted to CCAP 104 via fiber optic cable 106. At the request of CPD core 118, or in accordance with a pre-programmed routine in CPD core 118 and/or CCAP core 104, the I/Q samples of reference and actual CPD signals 133, 134 (combined return signal) are sent from CCAP core 104 to CPD core 118 for CPD detection and location processing. The I/Q samples include the components of both signals and are processed by core 118 as a combined return signal.

The types of return channels that can be utilized by the preferred embodiment of the present invention are described in Data-Over-Cable Service Interface Specifications, DCA-MHAv2, Remote Out-of-Band Specification, CM-SP-R-OOB-I06-170524 (May 24, 2017), published by Cable-Labs®, which is incorporated herein by reference (hereafter "OOB Specification"). These remote PHY return channels are also referred to as out-of-band (OOB) return channels. These channels are used to support physical layer (PHY) signaling for set-top box (STBs) equipment in subscriber networks 112. Millions of deployed STBs are dependent upon OOB return channels for localization, video control/enablement data delivery, code upgrades, and two-way interactive applications. The headend implementation for supporting remote PHY OOB signals is generally found in the CCAP core, but may also be in standalone function-dedicated auxiliary cores. A general description of remote PHY OOB signal channels are given in Section 5 (Overview) of the OOB Specification. The different return channel types include: (1) the SCTE 55-2 Remote PHY solution; (2) the SCTE 55-1 Remote PHY solution; (3) the narrowband digital return (NDR); (4) pilots; and (5) CW tones. Note that the present invention may also be implemented with an alternative return signaling mechanism using DOCSIS as a transport, called DOCSIS Set-top Gateway or DSG. See Data-Over-Cable Service Interface Specifications, DOCSIS Set-top Gateway (DSG) Interface Specification, CM-SP-DSG-I24-130808 (Aug. 8, 2013), published by Cable-Labs®, which is incorporated herein by reference. The term "return channel," in describing and claiming the present invention, shall be interpreted to include, but not be limited to, all the above mentioned return channel types and alternatives.

NDR is the most preferred return channel for the purposes of the present invention. An NDR channel sends digital samples as payload within packets which are transmitted or streamed from the remote PHY device to the CCAP core (or CMTS core). NDR can work with any type of OOB signal as long as the signal is contained within the defined passband (e.g., 9-14 MHz). The NDR channel is described in greater detail in Section 7.2 of the OOB Specification. The deployment of NDR is a "Must" requirement under the OOB specification; thus, the communication requirements of the present invention are or will be in-place in most modern HFC network systems. I/Q samples of reference and actual CPD signals 133, 134 can be received from CCAP core 104 by using standard communication protocols by any core, including CPD core 104. In other words, practical implementations of the present invention do not require additional software at CCAP core 104 or remote PHY device 108. The use of the NDR channel is also attractive because the NDR channel has a bandwidth (or passband) of 5.12 MHz, which provides reasonable time-distance resolution (around 0.2 μs or 30 meters) and good accuracy of ranging a CPD source in coaxial plant 110 (around 3 meters). Another advantage of using the NDR channel is that for transmission of baseband I/Q samples, only a minimal bit rate is required, which allows for long accumulation times (processing gain) at a correlation detector (e.g., in CPD core 118) without processing relatively large amounts of captured data. For example, an accumulation time of 100 ms (as in ARCOM Hunter® Xcor® System) will produce only about 1.3 MB of data.

In CPD generator 132, the simulated CPD signal is band-limited to the NDR channel to generate reference CPD signal 133 (i.e., reference CPD signal 133 has a bandwidth across the NDR band). The signal level of reference CPD signal 133 should be about 10-20 dB above noise in the NDR channel at chipset unit 122. This level will be sufficient to generate suitable samples of reference CPD signal 133 for correlation detection at CPD core 118. By limiting the level of reference CPD signal 133 to 10-20 dB above noise in the NDR channel, the same NDR channel can be used simultaneously for receiving other OOB signals, such as FSK signals from STBs, etc. Thus, the original utility or use of the NDR channel should not affected by most embodiments of the present invention.

Figure 2:
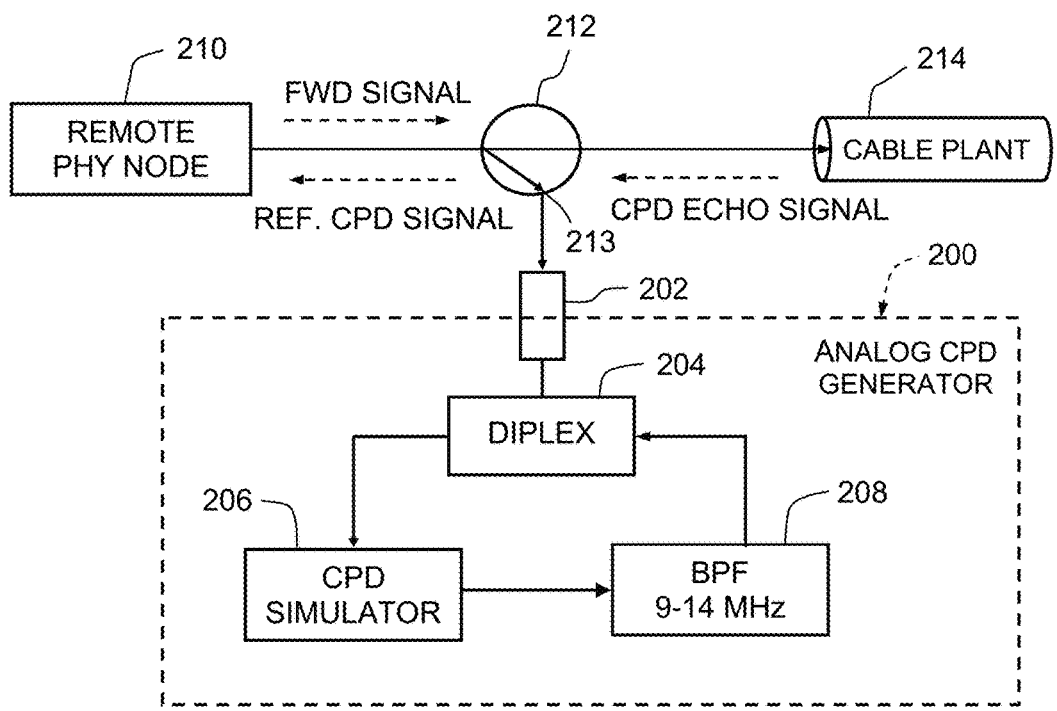
FIG. 2 is a block diagram of a passive, analog CPD generator of the present invention coupled to a remote PHY device via an output test port, where the CPD generator is used for generating a reference CPD signal to be supplied to the remote PHY device in synchronism with receipt of an actual CPD echo signal.

Referring now to FIG. 2, a block diagram of a passive, analog CPD generator 200, of the present invention, is shown. CPD generator 200 includes a coupling element 202, a diplex filter 204, a CPD simulator circuit 206, and a bandpass filter 208. CPD generator 200 is coupled to a remote PHY node 210 via coupling element 202, a test port 213, and an output tap 212. Output tap 212 is associated with remote PHY node 210. Tap 212 may be separate from or integral with node 210. If separate, tap 212 is located very close to the output of node 210. In either case, tap 212 is considered associated with node 210. A forward signal produced by node 210 travels downstream to a coaxial cable plant 214. A sampling of the forward signal is tapped from tap 212 via test port 213. Diplex filter 204 has high and low frequency paths (e.g., highpass and lowpass filters). The tapped forward signal is received by CPD generator 200 through coupling element 202 and the high frequency path of diplex circuit 204. The forward signal is then received by CPD simulator circuit 206 (e.g., a Schottky diode), which generates IM products of the forward signal. A low frequency band of the IM products is selected by bandpass filter 208, which has a passband substantially equal to the OOB return channel used in node 210. In this example, the return channel is 9 to 14 MHz. The band-limited IM products from filter 208 constitute the reference CPD signal, which is allowed to pass through the low frequency path of diplex circuit 204 and exit out coupling element 202. The reference CPD signal then travels through port 213, tap 212, and into remote PHY node 210, as described earlier with reference to FIG. 1.

As shown in FIG. 2, an actual CPD echo signal (created at a CPD source in cable plant 214 from the forward signal) travels back from cable plant 214 to node 210. Both reference and actual CPD signals are received by remote PHY node 210 in the return channel, within the round-trip interval (as defined earlier). Typically, the reference CPD signal is received by node 210 at the beginning of the round-trip interval and the actual CPD echo signal is captured by node 210 at the end of the round-trip interval. Thus, the reference and actual CPD signals are synchronized, in that the relative time delay between their arrivals in node 210 is maintained within the return channel (e.g., NDR channel).

Figure 3:
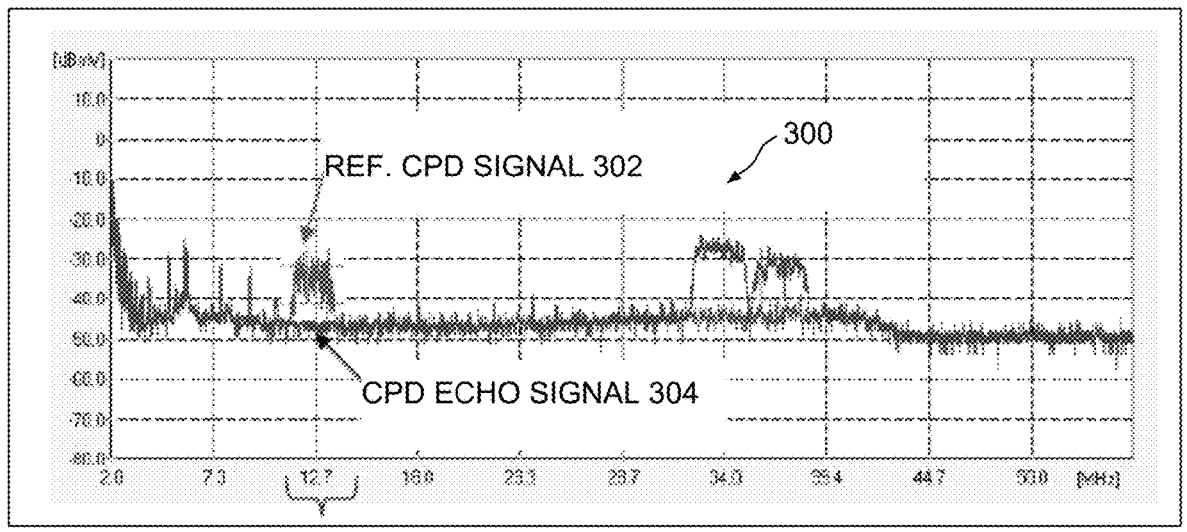
FIG. 3 is an image of a frequency spectrum showing the return spectrum of the HFC network with a narrowband digital return channel containing sync captured reference and actual CPD signals.

FIG. 3 shows a frequency plot of a return path spectrum 300 as viewed by remote PHY node 210 (FIG. 2). The plot extends from 2 to 50 MHz. As indicated, a reference CPD signal 302 and an actual CPD echo signal 304 are both located within a return channel at 9-14 MHz. This channel is the NDR channel. In this example, reference CPD signal 302 is produced by CPD generator 200 (FIG. 2) and actual CPD signal 304 is produced by a CPD source in cable plant 214. As shown in FIG. 3, the stronger spectral component in the NDR channel belongs to reference CPD signal 302 and the weaker spectral component (at or below noise level) belongs to actual CPD echo signal 304. Signals 302 and 304 are sync captured and will be processed as one combined return signal by a chipset in node 210.

Figure 4:
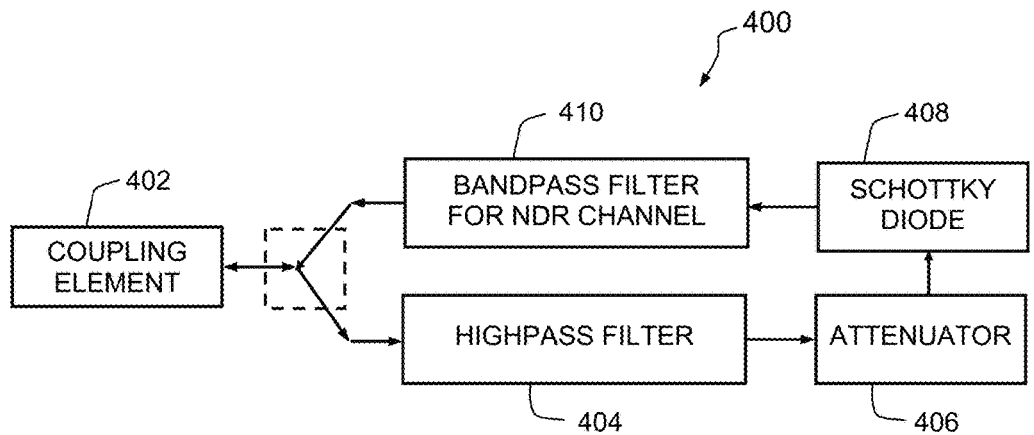
FIG. 4 is a block diagram of a more specific embodiment of the passive, analog CPD generator of FIG. 2, containing a highpass filter, an attenuator, a CPD simulator, and a bandpass filter.

Referring now to FIG. 4, there is shown a block diagram of a more specific embodiment of the present invention. A passive, analog CPD generator 400 comprises a coupling element 402, a highpass filter 404, an attenuator 406, a CPD simulator circuit 408, and a bandpass filter 410. Coupling element 402 may be any suitable type of RF signal coupling device or devices such as an RF cable connector (e.g., an F-connector), a coaxial jumper cable, a three-port coupler (e.g., in active embodiments), a combination of these, etc. Highpass filter 404 is preferably a passive LC filter (see FIG. 6) with a passband preferably extending over the entire forward path spectrum (e.g., 54 to 1002 MHz). Attenuator 406 is preferably a resistive Pi network (FIG. 6) which produces preferably 10 dB of attenuation. CPD simulator circuit 408 is preferably a Schottky diode (FIG. 6). Attenuator 406 is employed to further reduce the level of the forward signal and to match or isolate the connection between highpass filter 404 and CPD simulator circuit 408 (the Schottky diode). Bandpass filter 410 is preferably a passive LC filter (FIG. 6) with a passband preferably limited to and as wide as the NDR channel (e.g., 9-14 MHz). Optionally, a diplex filter may be inserted between coupling element 402 and filters 404 and 410, to address any impedance matching and isolation concerns.

Figure 5A:
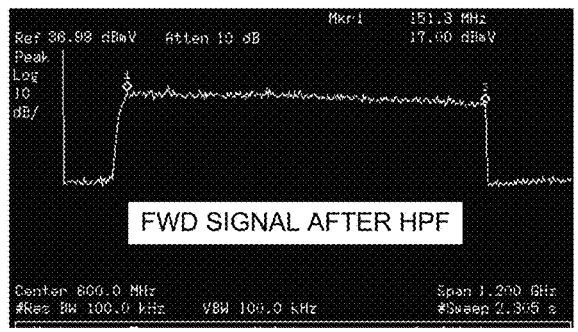
FIGS. 5A-5D are a series of frequency sweeps of a forward signal being processed at different points within the CPD generator of FIG. 4, where FIG. 5A displays the signal after the highpass filter, FIG. 5B displays the signal after the CPD simulator (Schottky diode), FIG. 5C displays the signal after the bandpass filter, and FIG. 5D displays the band-limited signal (at different scale) as the output of the CPD generator.
Figure 5B:
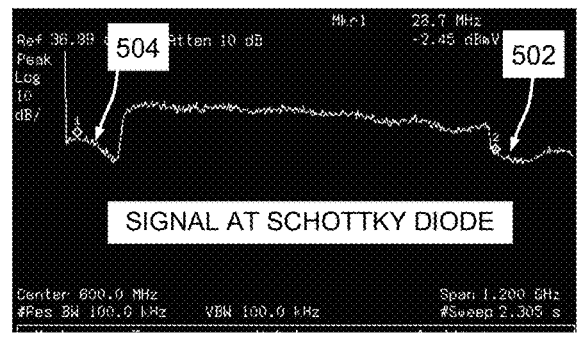
Figure 5C:
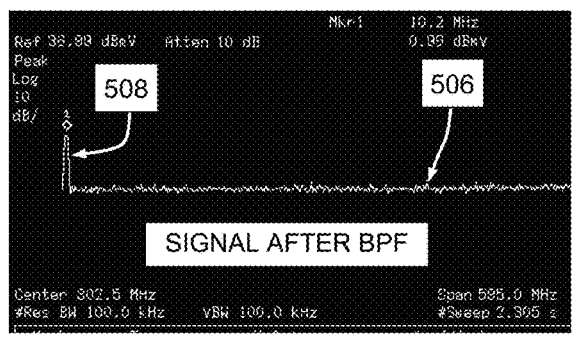
Figure 5D:
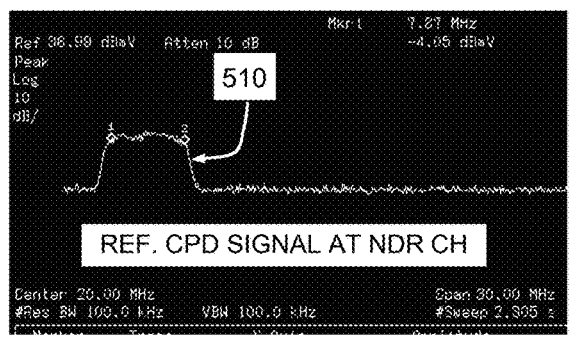

FIGS. 5A through 5D are a series of frequency sweeps of a forward signal being processed at different points within CPD generator 400 (FIG. 4). FIG. 5A displays the forward signal just after it has been filtered by highpass filter 404. FIG. 5B displays the forward signal after it has been attenuated by attenuator 406 and has interacted with CPD simulator circuit 408 (Schottky diode). Compare the signals displayed in FIGS. 5A and 5B. Because circuit 408 (Schottky diode) is a non-linear element, the signal in FIG. 5B is distorted by IM products. High and low frequency IM products 502, 504 can clearly be seen above and below the forward path spectrum. IM products 504 (in the return spectrum) have the same structure as an actual CPD echo signal (e.g., signal 134 in FIG. 1). That is why IM products 504 are used as a reference signal for detection of CPD by a cross-correlation method. FIG. 5C displays the return channel portion of the signal of FIG. 5B, where the signal of FIG. 5B has been filtered by bandpass filter 410. Note, the forward signal frequencies have been rejected or suppressed, as indicated by 506. Low frequency IM products 504 within the passband of filter 410 are shown in FIG. 5C as a reference CPD signal 508 (at 9-14 MHz). Lastly, FIG. 5D displays the band-limited signal 508 at a different scale, as an output signal 510 (reference CPD signal) of CPD generator 400. Signal 510 extends over the NDR channel with a bandwidth of about 5 MHz (actually 5.12 MHz) and centered at 11.5 MHz.

Referring now to FIG. 6, there is shown a circuit 600 of passive, analog CPD generator 400 (FIG. 4). A coaxial connector 602, corresponding to coupling element 402, functions as an input (for the forward signal) and an output (for the reference CPD signal). On the lower leg of circuit 600, there is a passive highpass filter 604 (corresponding to filter 404 in FIG. 4) realized with inductors L8-L10 and capacitors C8-C11, which produce the output shown in FIG. 5A. Also on the lower leg, an attenuator 606 (corresponding to attenuator 406) is realized with a Pi arrangement of resistors R1-R3 having values that produce 10 dB of attenuation. A Schottky diode 608 serves as the CPD simulator circuit (corresponding to circuit 408) and produces the response shown in FIG. 5B. On the upper leg of circuit 600, there is a bandpass filter 610 (corresponding to filter 410 in FIG. 4) realized with inductors L1-L7 and capacitors C1-C7, which produce the responses shown in FIGS. 5C & 5D. The component values for the inductors, capacitors and resistors shown in FIG. 6 are representative of a practical design; however, the invention (and even this embodiment) is not limited to these values.

The signal levels in circuit 600 will now be discussed with reference to FIGS. 1 and 6. A typical level of a forward signal from test port 131 (at connector 602) is about 30 dBmV (for 6 MHz QAM channel). If the value of attenuation of attenuator 606 is 10 dB, than the forward signal level at Schottky diode 608 will be about 20 dBmV. At diode 608, the forward signal generates IM products that are about −30 dB below the forward level; thus, the level of the IM products after diode 608 and bandpass filter 610 will be about −10 dBmV. Thus, the output of CPD generator 600 (at connector 602), i.e., the reference CPD signal, will be about −10 dBmV. This level is reduced by 20 dB after the reference CPD signal passes through test port 131 (FIG. 1). Thus, the reference CPD signal level is −30 dBmV after passing through tap 130 and the lowpass filter leg of diplex filter 128 (FIG. 1). Depending on the gain of return amp 126, the level of the reference CPD signal can be adjusted by selecting the attenuation of attenuator 606 to provide a suitable signal level at the input of chipset unit 112 (FIG. 1).

As indicated above, the expected signal level of IM products from diode 608 is about −10 dBmV. The high frequency IM products (i.e., IM products 502 in FIG. 5B) will travel in a reverse path through attenuator 606 (−10 dB) and highpass filter 604, and will have a level of −20 dBmV at connector 602. The isolation of tap 130 for a signal entering port 131 and leaking downstream of tap 130, is about 35-45 dB. Thus, the nominal level of the high frequency IM products (502 in FIG. 5B) traveling from connector 602, through tap 130, and to coaxial cable plant 110, will be about −55 to −65 dBmV. A typical level of the forward signal traveling from remote PHY node 108 to cable plant 110 is about +50 dBmV. This means that the high frequency IM signal (502 in FIG. 5B) will be at least 100 dB below the forward signal level at cable plant 110. Thus, the high frequency IM products leaking from CPD generator circuit 600 will not interfere with the forward signal in plant 110.

Referring now to FIG. 7A, a passive, analog CPD generator 700a includes a trap or cylindrical, hermetically-sealed, metal housing 704a. CPD Generator 700a is intended to be installed on the outside of a remote PHY device 701a. CPD generator housing 704a includes an RF coaxial cable connector 702a, such as an F-connector. Contained within housing 704a is a circuit board 706a populated with circuit 600 (FIG. 6). Connector 702a is configured to connect physically and electrically to a corresponding, externally disposed connector 703a of remote PHY device 701a. CPD generator housing 704a is shown with its cylindrical wall cut-away to show circuit board 706a mounted therein. The construction of housing 704a and the assembly of circuit board 706a within housing 704a are well-known and will not be further described. An example of a similar housing and board construction/assembly is disclosed in U.S. Pat. No. 8,458,759 (Jun. 4, 2013) to Zinevich et al., which is incorporated herein by reference. An example of remote PHY device 701a is a product by Harmonic Inc., 4300 North First Street, San Jose, Calif., called CableOS Ripple-1 (www.harmonicinc.com/products/product-detail/remote-phy-node-cableos-ripple1).

Referring to FIG. 7B, a passive, analog CPD generator 700b includes a circuit board 706b populated with circuit 600 (FIG. 6). Optionally, board 706b may be enclosed in a protective enclosure, jacket or shield. CPD Generator 700b is intended to be installed within a housing of a remote PHY device 701b. An RF coaxial cable connector 702b (e.g., an F-connector) is rigidly mounted to circuit board 706b. Connector 702b is configured to connect physically and electrically to a corresponding, internally disposed connector 703b of remote PHY device 701b.

Referring back to FIG. 1, the I/Q baseband samples of the return channel (e.g., NDR channel), produced by chipset unit 122, are received by CCAP core 104 via optical fiber cable plant 106. CCAP 104 relays the I/Q baseband samples to CPD core 118, either automatically or at the request of CPD core 118. CPD core 118 captures the I/Q baseband samples during a time interval long enough to provide sufficient processing gain in a correlation detector implemented within CPD core 118. This time interval may be referred to as accumulation time. The sensitivity of detection of CPD is dependent on the processing gain or accumulation time. As will be explained below, for most embodiments, the accumulation time should be about 800 milliseconds to achieve a CPD detection sensitivity of 30 dB below the system/channel noise floor.

The combined return signal S (both reference and actual CPD signals) received by CPD core 118 can be represented as:

$$S = Sr + Sa + N,$$

where:
Sr is reference CPD signal 133 of CPD simulator 132;
Sa is actual CPD echo signal 134 from CPD source 136;
N is ingress from cable plant 110 plus internal noise in the NDR channel In the preferred embodiment, as CPD core 118 receives the combined return signal S, CPD core 118 begins to calculate the autocorrelation function A(t) of signal S, which can be represented as:

$$A(t) = A1(t) + A2(t) + C(t),$$

where:
$A1(t) = (Sr \times Sr)$, the autocorrelation function of reference CPD signal 133;
$A2(t) = (Sa+N) \times (Sa+N)$, the autocorrelation function of actual CPD signal 134 plus ingress/noise N;
$C(t) = (Sr \times (Sa+N))$, the cross-correlation function of reference and actual CPD signals plus ingress/noise signal N. Cross-correlation function C(t) corresponds to the response of an optimal cross-correlation detector (or a matched filter configured to match to actual CPD signal 134). Each correlation peak of cross-correlation function C(t) has a time delay corresponding to an associated round-trip interval (i.e., time of forward signal to propagate from remote PHY node 108 to the CPD source plus time of the actual CPD signal to propagate from the CPD source back to remote PHY node 108). In accordance with the preferred embodiment of the present invention, CPD detection includes extraction and detection of peaks of cross-correlation function C(t) from the autocorrelation function A(t). The term "extraction," in the context of the present invention, means removing or minimizing the masking effect (or correlation noise) of at least the autocorrelation function $A1(t)$ on the cross-correlation peaks of function C(t).

Figure 8:
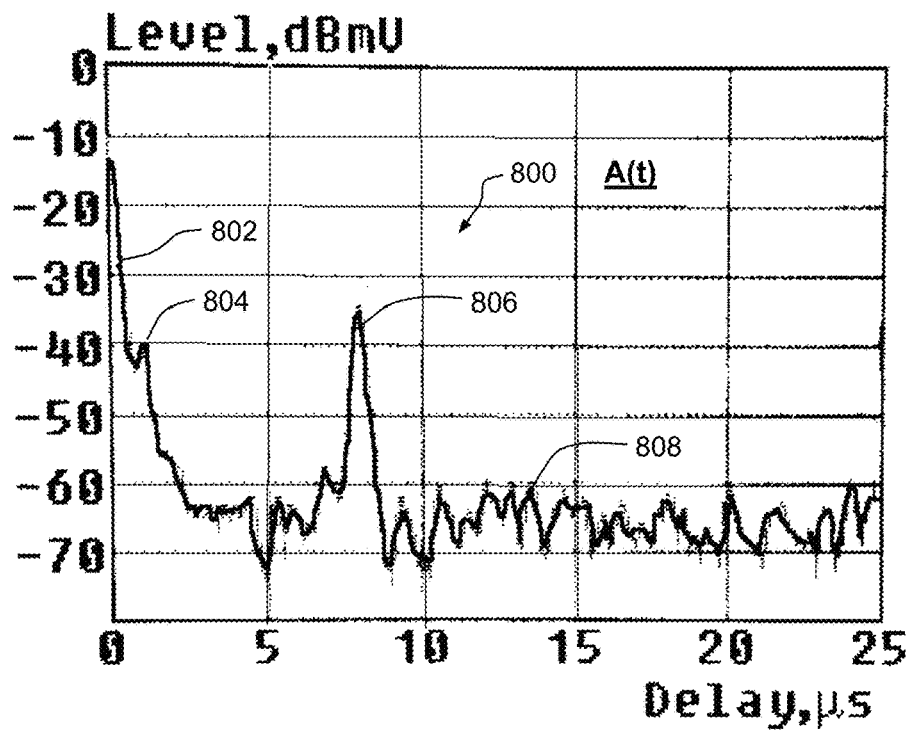
FIG. 8 is an example of an autocorrelation function of a combined return signal containing reference and actual CPD signal signals.

FIG. 8 shows an envelope 800 of an autocorrelation function A(t) of a combined return signal. Autocorrelation A(t) is referred to herein as a combined autocorrelation function. Envelope 800 was computed from data collected in a bench test of the present invention, where the return channel is the NDR channel having a bandwidth of 5.12 MHz. Envelope 800 is a plot of signal level in dBmV versus time delay in microseconds. As shown, envelope 800 has a first peak 802 at zero time delay, a second peak 804 corresponding to a first actual CPD echo signal with a 1.5 µs time delay, a third peak 806 corresponding to a second actual CPD echo signal with a 8 µs time delay, and a "correlation noise" floor 808 formed primarily by sidelobes of composite function A(t). Floor 808 is like a real noise floor in that it limits the sensitivity of detection of a CPD cross-correlation peak. It is sometimes referred to simply as a "noise floor" below.

Figure 9:
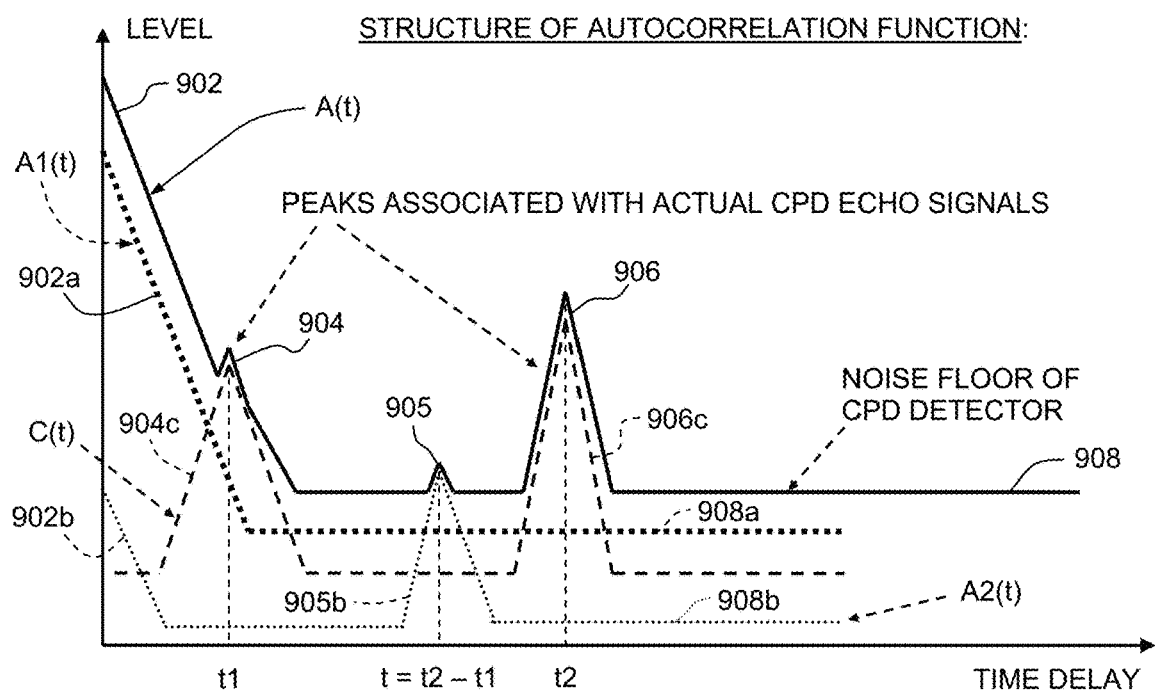
FIG. 9 is a diagram of the structure of the autocorrelation function of FIG. 8, showing contributions of different terms of the function, such as the autocorrelation of the reference CPD signal, autocorrelation of the actual CPD (echo) signal, and cross-correlation of the reference and actual CPD signals.

FIG. 9 is a diagram of the structure of the combined autocorrelation function A(t) of FIG. 8. The structure delineates the contributions of the different terms of composite function A(t), including an autocorrelation function of the reference CPD signal $A1(t)$, the autocorrelation function of the actual CPD (echo) signal plus noise $A2(t)$, and the cross-correlation function C(t) of the reference and actual CPD signals. The composite function A(t) and the different terms of A(t) are plotted in FIG. 9 in units of signal level versus time delay. Composite function A(t) has a first peak 902 at zero time delay, a second peak 904 at a time delay t1, a third peak 906 at a time delay t2, a fourth peak 905 at a time delay of t2−t1, and a correlation noise floor 908. Autocorrelation term $A1(t)$ has a peak 902a and a correlation noise floor 908a. Autocorrelation term $A2(t)$ has a peak 902b, a peak 905b, and a correlation noise floor 908b. Cross-correlation term C(t) has a peak 904c and a peak 906c. Peaks 904c and 906c represent detection of two actual CPD echo signals originating from differently located CPD sources (thus, the peaks are at two different time delays, t1 and t2).

In order to produce uncorrupted or suitable reference CPD signal samples for CPD detection, a relatively high signal level (relative to actual CPD echo signal) for the reference CPD signal is desired. As mentioned earlier, the reference CPD signal may have a level at the output of CPD generator 132 (or 400 or 600) of about −10 dBmV, which also may be the level at chipset unit 122 assuming return amp 126 has 20 dB gain). Thus, the autocorrelation function of the reference CPD signal, $A1(t)$, will be the strongest contributor in the combined autocorrelation function A(t). This is illustrated in FIG. 9, where function $A1(t)$ has the highest peak (peak 902a) and the highest correlation noise floor (floor 908a) of all the terms, $A1(t)$, $A2(t)$ and C(t). Peak 902 of composite function A(t) masks cross-correlation peak 904c, which represents a CPD source close to remote PHY node 108. Correlation noise floor 908 of composite function A(t) masks cross-correlation peaks 904c and 906c, where noise floor 908 is mainly caused by sidelobes (noise floor) of function $A1(t)$. This result is counter to optimal CPD detection, which utilizes the cross-correlation function C(t). Thus, it would be desirable to remove or at least minimize the masking or shadowing effect of A1(t) on cross-correlation peaks 904c and 906c (a process called "extraction").

Other features in FIG. 9 are now discussed. Peak 902b of autocorrelation function A2(t), at zero time delay, contributes to additional masking of cross-correlation peak 904c. Also, function A2(t) has peak 905b, which results from the cross-correlation between the two actual CPD echo signals (represented by peaks 904c & 906c). Peak 905b has a time delay T=t2−t1. Peak 905b is referred to as a "false peak." A false peak may also interfere with the detection of cross-correlation peaks 904c and 906c. However, in general, cross-correlation peaks 904c and 906c will have a higher level than a false peak. In addition, technicians are typically trained to remove first a CPD source represented by the highest cross-correlation peak. If this routine is followed, then the false peak will simply disappear upon removal of the first CPD source. As established above, function A1(t) is the primary interference contributor to CPD detection (sometimes referred to as "correlation interference").

Figure 10A:
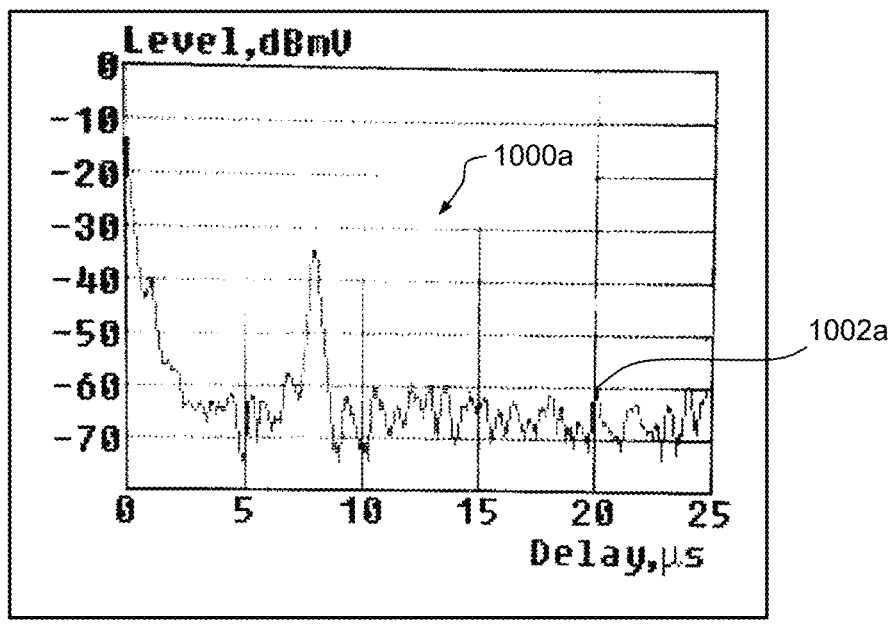
FIGS. 10A and 10B show a pair of autocorrelation functions of the combined return signal demonstrating reduction in noise floor by increasing effective accumulation time of the autocorrelation, where
Figure 10B:
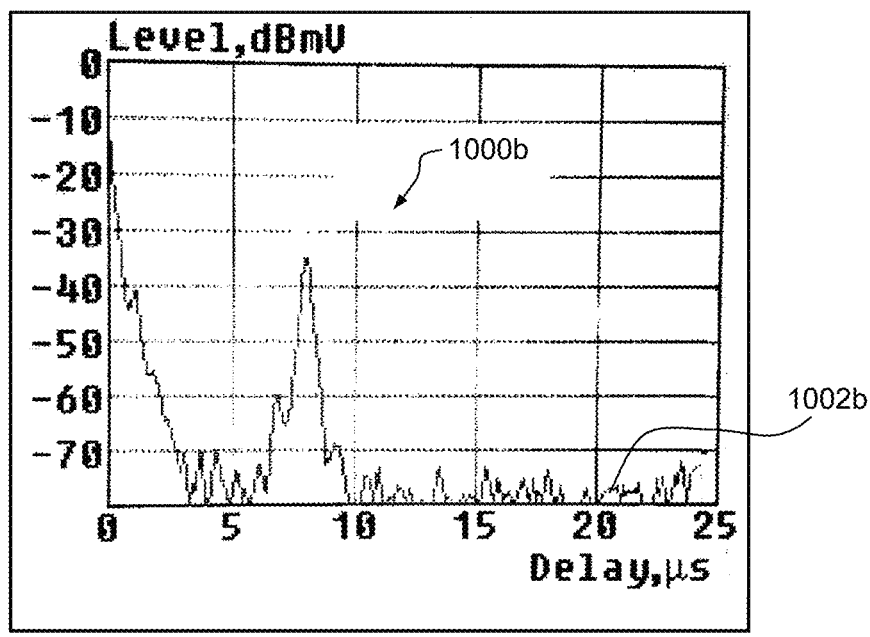

Correlation noise floor 908 in function A(t) can be reduced by increasing the duration of the captured combined returned signal. This is equivalent to increasing the accumulation time or processing gain for the combined autocorrelation. This step is illustrated in FIGS. 10A and 10B. FIG. 10A shows an autocorrelation function 1000a of a combined return signal in an NDR channel of 5.12 MHz, obtained from data collected in an actual bench test. Function 1000a is very similar to the function in FIG. 8. Both represent the same test setup, with two CPD sources generating a cross-correlation peak at about 1.5 µs and another at about 8 µs. However, in FIG. 10A, function 1000a is based on a combined return signal having a duration (or accumulation time) of only 50 milliseconds. Notice a correlation noise floor 1002a at a level of about −65 dBmV. Now compare this with a combined autocorrelation function 1000b in FIG. 10B. FIG. 10B represents the same test setup as FIG. 10A. However, function 1000b is based on a combined return signal having a duration (or accumulation time) of 800 milliseconds. Notice a correlation noise floor 1002b at a level of about −80 dBmV. Thus, the noise floor has been reduced by more than 12 dB (≈15 dB). FIGS. 10A and 10B demonstrate a reduction in noise floor by increasing the effective accumulation time of the autocorrelation. The reduced correlation noise floor in FIG. 10B means that the cross-correlation (CPD) peaks can be detected with increased sensitivity of about 12-15 dB. Thus, an effective accumulation time of 800 milliseconds is a recommended parameter for the autocorrelation operation in most embodiments of the present invention.

Figure 11:
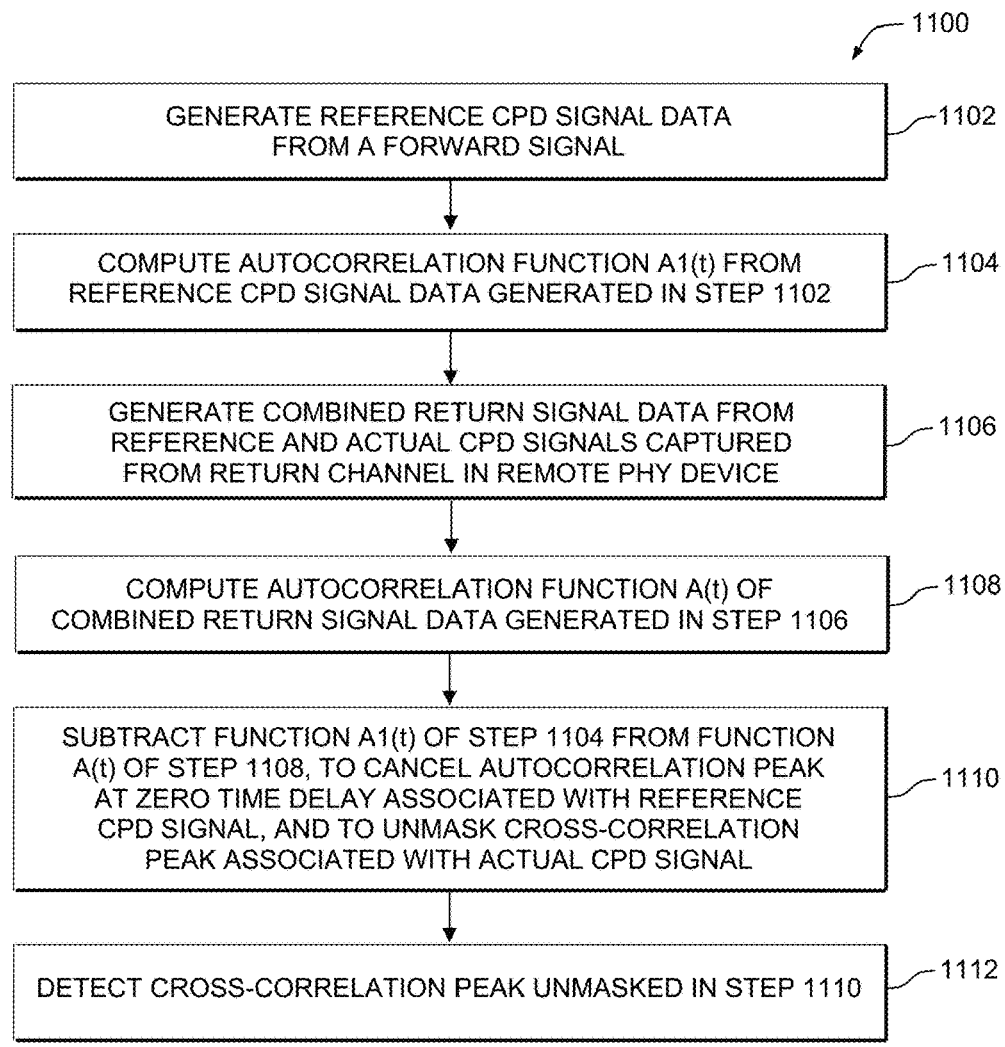
FIG. 11 is a flow diagram of a method of canceling the autocorrelation term of the reference CPD signal (including a main peak at zero time delay) from an autocorrelation function of the combined return signal, in order to unmask the cross-correlation terms, particularly at short time-distances.

In addition to the above step, or as an alternative, a cancellation method 1100, outlined in FIG. 11, may be employed to reduce the masking effect of main peak 902 (FIG. 9) and its sidelobes. In a first step 1102 of method 1100, a reference CPD signal is generated from a forward signal and I/Q baseband data samples are created. This step may be carried out in the field, where, for example, the output of tap 130 (FIG. 1) is terminated while CPD generator 132 generates a reference CPD signal from the forward signal captured from port 131. Then, the reference CPD signal is supplied to remote PHY node 108 and received in chipset unit 122. Baseband I/Q samples of the reference CPD signal are created in chipset unit 122 and then sent to CCAP core 104 and then to CPD core 118. In a second step 1104, an autocorrelation function A1(t) of the reference CPD signal data is computed. The computed A1(t) is stored in memory in CPD core 118 as a "calibration curve." As a practical matter, the field approach would take place upon installation of remote PHY node 108. A calibration curve from one field installation of node 108 could be saved and distributed as a default curve for all other remote PHY nodes in the field. In an alternative approach, steps 1102 and 1104 are carried out in a lab or factory as part of a bench calibration procedure. Note, it is preferred that the computation of A1(t) include the complete complex autocorrelation function for A1(t).

The description of method 1100 continues. In a third step 1106, the normal operation of CPD generator 132 and remote PHY node 108 is performed to generate a combined return signal (I/Q baseband data samples) from reference and actual CPD signals captured in the return channel in remote PHY node 108. The combined return signal data is sent to the CCAP core and then to the CPD core. In a fourth step 1108, an autocorrelation function A(t) of the combined return signal data is computed in CPD core 118. In a fifth step 1110, the stored calibration curve or function A1(t) is subtracted from autocorrelation function A(t). This step will substantially cancel at least the main peak (e.g., 902) at zero time delay, associated with the reference CPD signal. The main peak will be canceled by more than 40-50 dB (due to the strength of the A1(t) term). The cancellation of peak 902 will substantially unmask the cross-correlation peak closest to zero (e.g., 904c), which is associated with the actual CPD echo signal. The correlation noise floor (or sidelobes of peak 902) may be reduced also in this step. In a sixth step 1112, the unmasked cross-correlation peak is detected in CPD core 118. A further step in the method may be to update the calibration curve from time-to-time by repeating steps 1102 and 1104.

Figure 12:
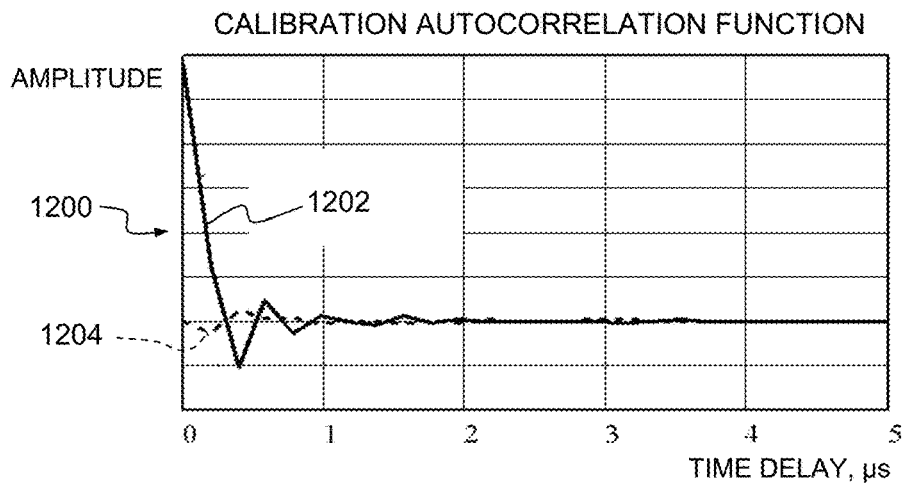
FIG. 12 is a plot of a pre-determined complex autocorrelation function used to cancel (or subtract) the autocorrelation term of the reference CPD signal from the autocorrelation function of the combined return signal.

FIG. 12 shows a plot 1200 (in linear amplitude scale) of the complex autocorrelation function A1(t) computed and stored in step 1102 and used in step 1106 to subtract from the combined autocorrelation function A(t). The complex function includes a real part 1202 and an imaginary part 1204. Both parts are subtracted from corresponding parts of the combined autocorrelation function produced in step 1104 (FIG. 11).

Figure 13A:
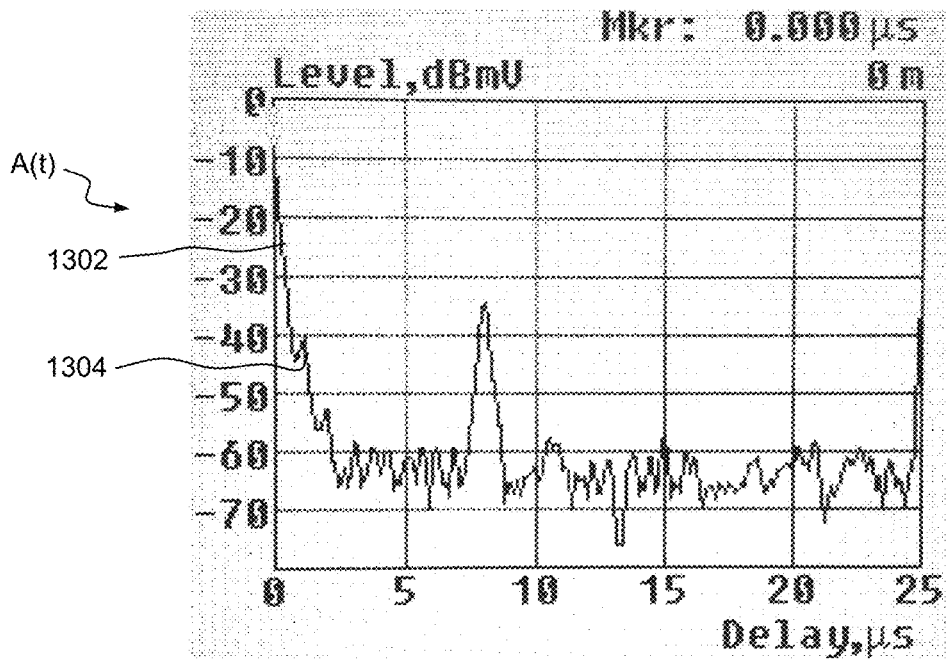
FIGS. 13A and 13B are before and after plots of an autocorrelation function of a combined return signal, produced from an actual bench test, illustrating the effectiveness of the cancellation method outlined in FIG. 11.
Figure 13B:
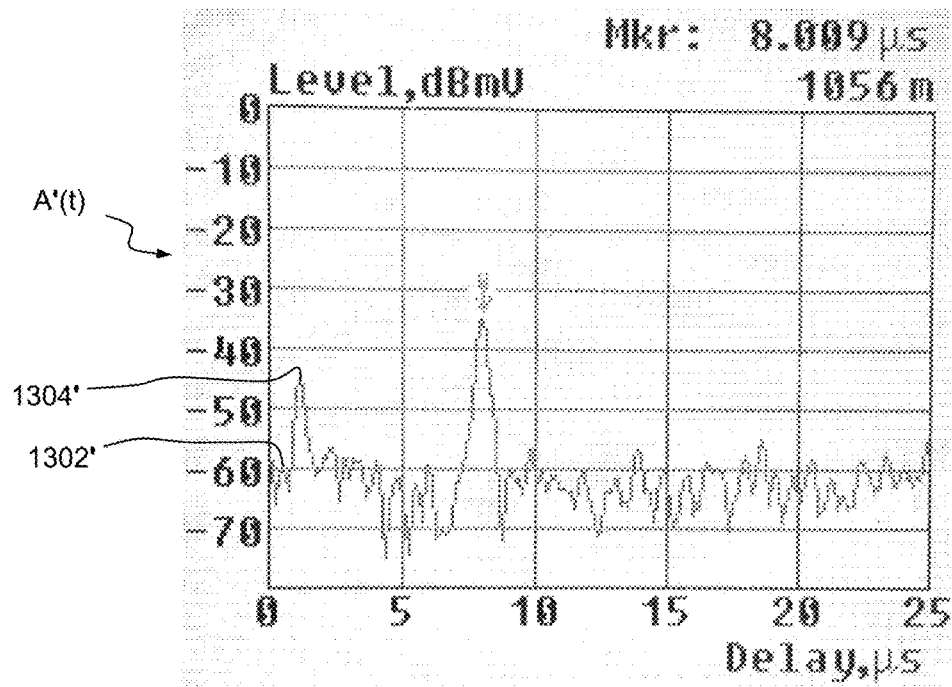

FIGS. 13A and 13B are before-and-after results, derived from a bench test, that demonstrate the effectiveness of cancellation method 1100. FIG. 13A shows a combined autocorrelation function A(t), as obtained in step 1104, before subtraction of the calibration curve obtained/stored in step 1102. Note the presence of a main peak 1302 and a nearby masked cross-correlation peak 1304. FIG. 13B shows a corrected autocorrelation function A'(t), which is the result after subtraction of the calibration curve in step 1106. Note from an inspection of A'(t), main peak 1302 is substantially removed. Remnants of the peak, designated as 1302' in FIG. 13B, are more than 50 dB down from the maximum level of original peak 1302. Also, nearby cross-correlation peak 1304 is shown in FIG. 13B as being substantially unmasked and cleared for detection (with a signal-to-noise ratio of about 15 dB).

It should be noted that method 1100 (FIG. 11) will work well with low level actual CPD echo signals and ingress from the coaxial cable plant. However, with an increase in levels of actual CPD echo signals and ingress, the efficiency of cancellation will be reduced, because the contribution of peak 902b (see FIG. 9) of function A2(t) will be increased. On the other hand, in the case of increased levels of actual CPD echo signals, the levels of the cross-correlation (CPD) peaks (e.g., 904c & 906c in FIG. 9) will also increase. Thus, the negative effect of increased CPD echo signal levels will be offset by the increased cross-correlation peak levels. More of a concern is an increase in ingress level in the coaxial cable plant. However, ingress level usually varies over the course of a day, so CPD detection can be carried out according to a scheduler and when the ingress level is minimal. Also, in many cases, ingress behaves like pulse noise. In such cases, ingress pulses, received as part of the I/Q baseband samples, could be blanked (e.g., by zero stuffing) in CPD core 118 before the autocorrelation computation.

Heretofore, a passive CPD generator embodiment has been discussed. A passive solution is preferable from the point of view of simplicity, cost, and compatibility with different models of remote PHY devices. However, active embodiments of the present invention are also contemplated. Active embodiments are those requiring power to operate. As will be discussed, the active elements are signal processing components. These components are used to overcome interference between the reference and the actual CPD signals and/or to better resolve the two signals, for improved CPD detection and location. The active embodiments are discussed below with reference to FIGS. 14-17.

Figure 14:
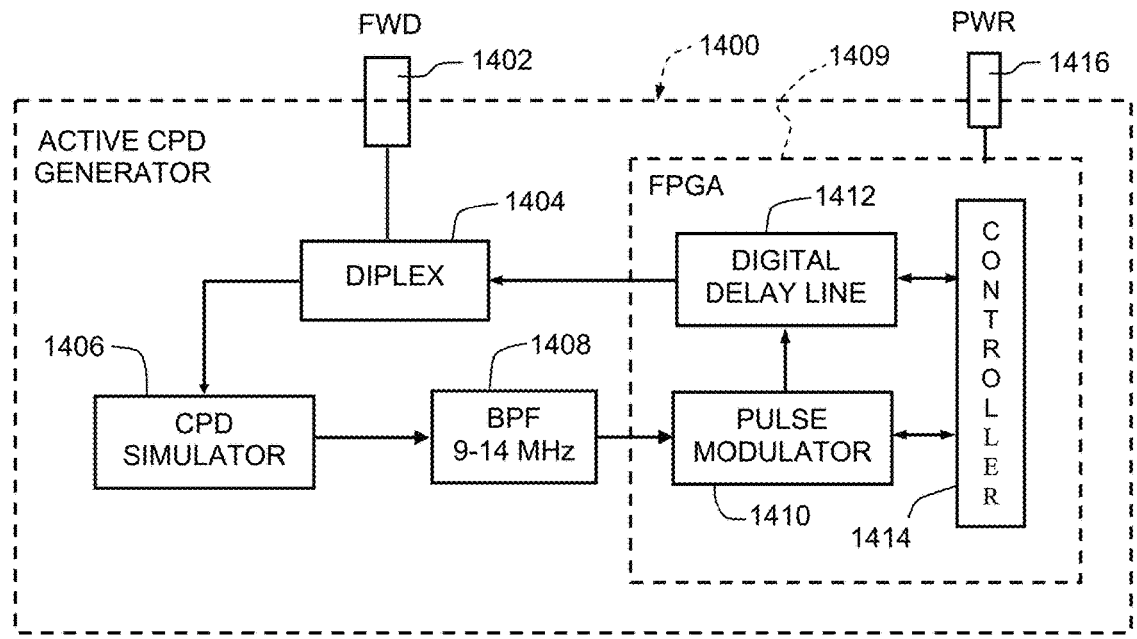
FIG. 14 is a block diagram of a second embodiment of a CPD generator of the present invention, showing the addition (from FIG. 2) of active circuits including a pulse modulator and a digital time-delay line.

Referring now to FIG. 14, there is shown a block diagram of a CPD generator 1400, constructed in accordance with a second embodiment of the present invention. CPD generator 1400 is an active device, requiring power. Generator 1400 includes a coupler element 1402, a diplex filter 1404, a CPD simulator circuit 1406, a bandpass filter 1408, a pulse modulator 1410, a digital delay line 1412, a controller 1414, and a power input port 1416. Coupler element 1402 is preferably an RF F-connector for connecting directly to a test port associated with a remote PHY device. In operation, a forward signal from a remote PHY device is received by generator 1400 via connector 1402. Diplex filter 1404 has high and low frequency paths (e.g., highpass and lowpass filters). The forward signal is received through the high frequency path of diplex filter 1404. CPD simulator circuit 1406 is preferably a Schottky diode, but, in this active embodiment, it may be a FET transistor circuit. CPD simulator 1406 generates IM products of the forward signal, and a low frequency band of the IM products is selected by bandpass filter 1408. Filter 1408 has a passband substantially equal to the OOB return channel (e.g., NDR channel) used in the associated remote PHY device. The band-limited output of filter 1408 constitutes the reference CPD signal.

Figure 15:
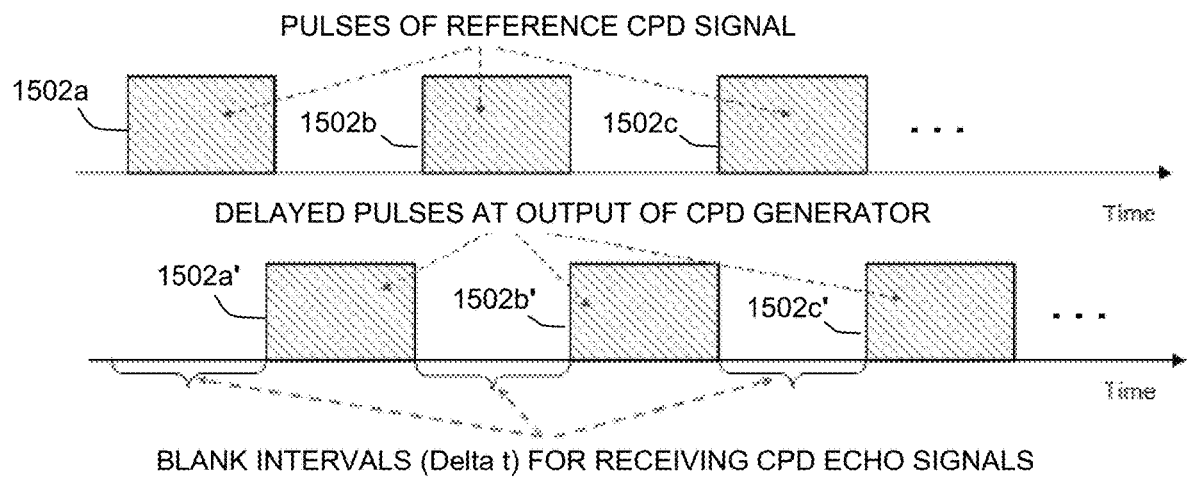
FIG. 15 is a series of timing diagrams for use in explaining the operation of the CPD generator of FIG. 14.

Preferably, pulse modulator 1410, delay line 1412, and controller 1414 are all implemented in a field-programmable gate array (FPGA) chip 1409. One suitable FPGA chip is a Xilinx® FPGA XC3S400A-4FTG256C, manufactured Xilinx, Inc., San Jose, Calif. Pulse modulator 1410 may be implemented in the FPGA as an ON/OFF switch of digital samples. Pulse modulator 1410 and delay line 1412 may instead be implemented as separate commercially available microchips. Controller 1414 controls the operation of pulse modulator 1410 and delay line 1412. In operation, the reference CPD signal is processed by pulse modulator 1410 to shape the reference CPD signal into a periodic sequence of pulses. FIG. 15 shows the reference CPD signal in the form of pulses 1502a, 1502b, 1502c, . . . (top diagram). Pulses 1502a, 1502b, 1502c, . . . are then delayed by a unit of time, delta t, in digital delay line 1412. The output of delay line 1412 is a sequence of delayed pulses 1502a', 1502b', 1502c', . . . (bottom diagram in FIG. 15). The delayed pulses pass through the low frequency path of diplex filter 1404 and then through connector 1402 to the remote PHY device. Delta t is chosen to be greater than the expected maximum round-trip interval (between the remote PHY device and a CPD source in the coaxial cable plant). As an example, delta t should be greater than 50 µs. This will allow the actual CPD echo signal to be received in the remote PHY device without any interference by the reference CPD signal (in the same channel). In other words, the CPD echo signal is received during a "quiet period," during which the reference CPD signal is being delayed (see bottom diagram in FIG. 15). This approach is akin to the simplex method of communication, where the same channel is used for both transmission and reception sessions.

Power for the active circuits in CPD generator 1400 is obtained from the associated remote PHY device via a power output port on the device. The power from the remote PHY device is usually +24 VDC. A power cable is connected between the output port of the remote PHY device and power input port 1416. In some remote PHY devices, a combined RF and power output port may be available to permit power to be received through coupler element 1402. In CPD generator 1400, a power supply (not shown) will divide the voltage down to appropriate values for powering the FPGA chip or any other microchips used to implement pulse modulator 1410, digital delay line 1412, and/or controller 1414.

In the second embodiment, the accumulation time of the autocorrelation should also be 800 milliseconds. If the pulse width of each pulse 1502a, 1502b, 1502c, . . . is 100 milliseconds and delta t is 100 milliseconds, then four pulses and four delta t intervals will cover 800 milliseconds for the composite autocorrelation function. In this embodiment, the reference CPD signal level should be set higher than in the passive embodiment, because of the reduced risk of interference with the actual CPD echo signal and the desire to obtain high fidelity reference samples.

Figure 16:
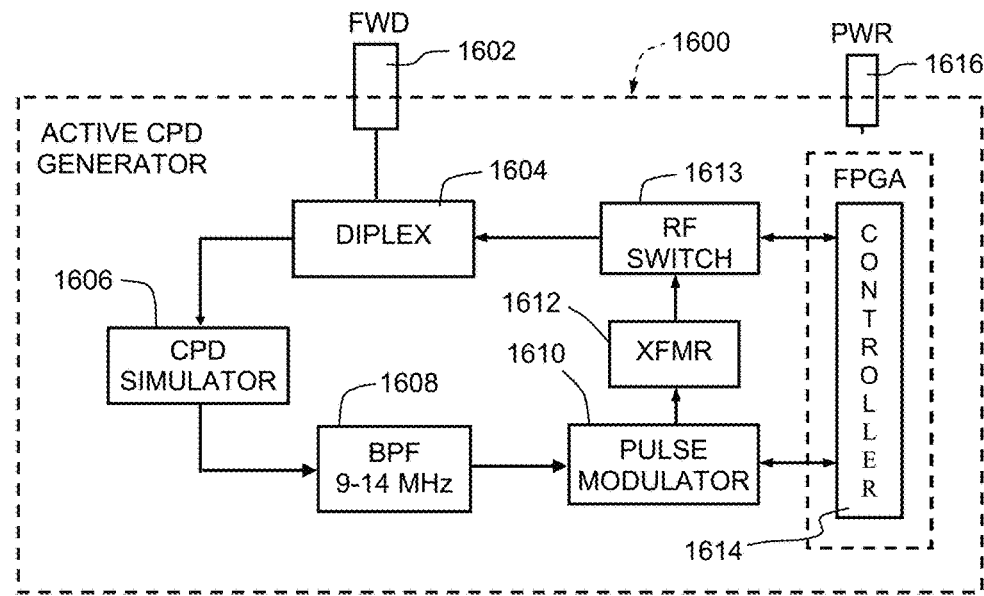
FIG. 16 is a block diagram of a third embodiment of a CPD generator of the present invention, showing the addition (from FIG. 2) of active circuits including a pulse modulator and an analog phase-shifter circuit.

Referring now to FIG. 16, there is shown a block diagram of a CPD generator 1600, constructed in accordance with a third embodiment of the present invention. CPD generator 1600 is an active device, requiring power. Generator 1600 includes a coupler element 1602, a diplex filter 1604, a CPD simulator circuit 1606, a bandpass filter 1608, a pulse modulator 1610, a phase inverter circuit 1612, an RF switch 1613, a controller 1614, and a power input port 1616. Coupler element 1602 is preferably an RF F-connector for connecting directly to a test port associated with a remote PHY device. Generator 1600 receives a forward signal from the remote PHY device via connector 1602. Diplex filter 1604 has high and low frequency paths, and the forward signal is received through the high frequency path. CPD simulator circuit 1606 is preferably a Schottky diode, but may be a FET transistor circuit. CPD simulator 1606 generates IM products of the forward signal. A low frequency band of the IM products is selected by bandpass filter 1608. Filter 1608 has a passband substantially equal to the OOB return channel (e.g., NDR channel) used in the associated remote PHY device. The band-limited output of filter 1608 constitutes the reference CPD signal.

In this third embodiment, pulse modulator 1610 and RF switch 1613 may be commercially available microchips, and phase inverter circuit 1612 may be an analog transformer or a transistor circuit. Preferably, controller 1614 is implemented in a FPGA chip, as in the second embodiment. Controller 1614 controls the operation of pulse modulator 1610 and RF switch 1613. In operation, the reference CPD signal is processed by pulse modulator 1610 to shape the reference CPD signal into a sequence of long-duration pulses. Then, every other pulse of the sequence is phase inverted (i.e., shifted 180 degrees relative to the un-inverted pulses). See the sequence of pulses 1700 in FIG. 17.

Figure 17:
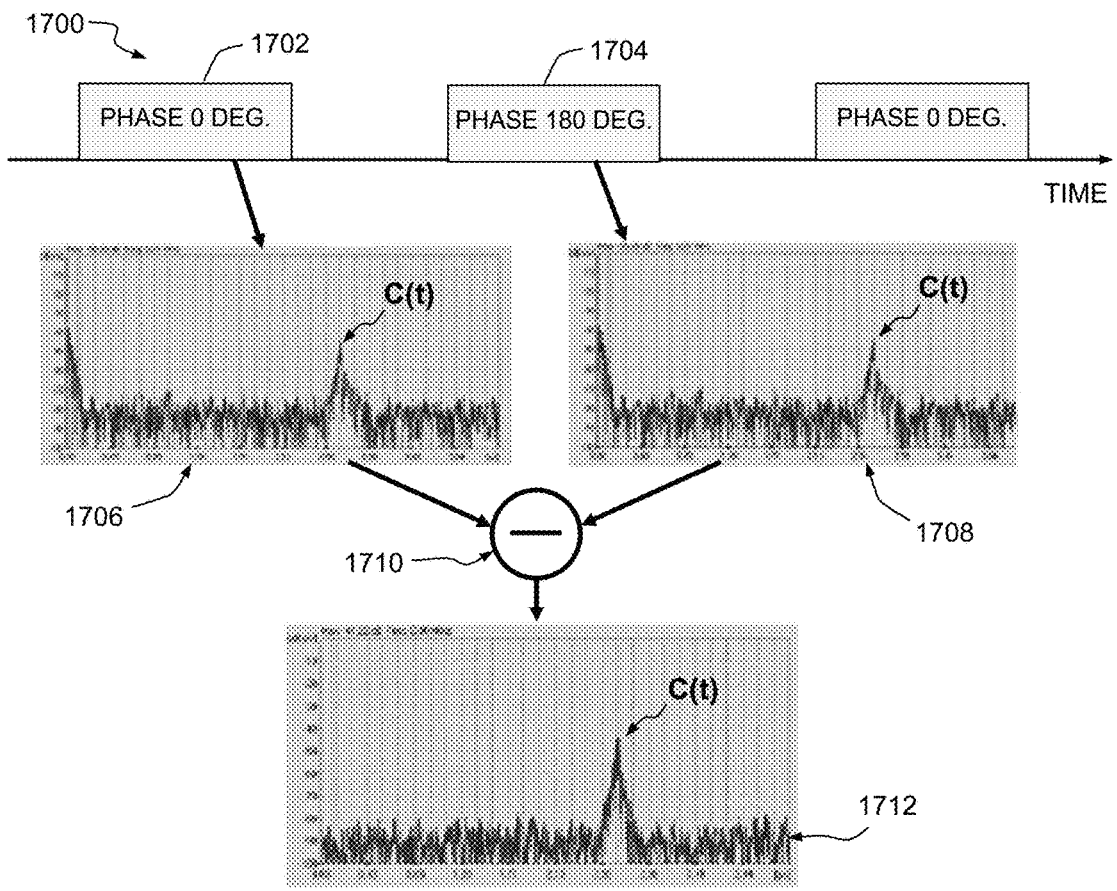
FIG. 17 is a series of diagrams illustrating operation of the CPD generator of FIG. 16.

Phase-inversion of every other pulse is accomplished by phase inverter 1612 in conjunction with RF switch 1613 and under control of controller 1614. Each of the pulses 1700 (0/180 degrees) represents a reference CPD signal, preferably about 800 milliseconds in duration. Pulses 1700 pass through the low frequency path of diplex filter 1604 and then through connector 1602 to the remote PHY device. Referring to FIG. 17, a first pulse 1702 has a phase of zero degrees and a second subsequent pulse 1704 has a phase of 180 degrees. Pulse 1702, representing the reference CPD signal, is received by the remote PHY device from generator 1600. The remote PHY device also receives an associated actual CPD echo signal from the coaxial cable plant. As in the passive embodiment, both signals are processed as a combined return signal. At a CPD core, a combined autocorrelation function 1706 (FIG. 17) is computed from the combined return signal. This process is repeated for second pulse 1704. Pulse 1704 is received by the remote PHY device from generator 1600, and remote PHY device also receives a second associated actual CPD echo signal from the coaxial plant. Both signals are processed as a combined return signal, and an autocorrelation function 1708 (FIG. 17) is generated therefrom.

Because autocorrelation function 1708 was computed from a combined signal having a 180 degree phase-shifted reference signal, the cross-correlation terms of the function will be negative (−C(t)). Thus, in the next processing step 1710 (FIG. 17), function 1708 is subtracted from function 1706. The autocorrelation terms of the reference signal A1(t) and echo signal A2(t) are squared, positive terms; thus, they cancel out in the subtraction. The cross-correlation terms add (e.g., [C(t)−(−C(t)]). As shown in FIG. 17, a resultant function 1712 is produced from the subtraction step 1710. Note from function 1712 that: (1) the zero time delay peak, contributed mainly by the A1(t) term, is substantially removed; (2) the correlation noise floor is reduced; and (3) the cross-correlation term C(t) (remaining peak) is more prominent for detection.

Power for CPD generator 1600 is obtained from the associated remote PHY device via a power output port on the device. The power from the remote PHY device is usually +24 VDC. A power cable is connected between the output port of the remote PHY device and power input port 1616. In some remote PHY devices, a combined RF and power output port may be available to permit power to be received through coupler element 1602. In CPD generator 1600, a power supply (not shown) will divide the voltage down to appropriate values for powering the active circuits, such as pulse modulator 1610, RF switch 1613, and the FPGA chip (controller 1614).

In the third embodiment, the preferred accumulation time for the combined autocorrelation is 800 milliseconds. This accumulation time can be established by setting the duration of each pulse 1700 to 800 milliseconds. The blank interval between pulses 1700 (e.g., between pulses 1702 and 1704) is used in the CPD core to trigger the end of one autocorrelation and the beginning of the next autocorrelation (at opposite phase). CPD echo signal samples will be received during the blank interval between pulses; however, the stronger reference CPD signal will not be receiving during this interval. Thus, the CPD core can recognize the interval between pulses and use it as a control mechanism or trigger.

In the second and third (active) embodiments of the CPD generator, an amplifier with automatic gain control (AGC) may be inserted after the highpass filter leg of the diplex filter (1404/1604) and before the CPD simulator circuit (1406/1606), to provide better isolation and signal level stability of the forward signal before IM production. Also, an attenuator (as in the passive embodiment) may be inserted between the AGC amp and the CPD simulator circuit.

In all CPD generator embodiments, the level of the reference CPD signal should be higher than the noise floor in the return channel at the remote PHY device. In the first (passive) and third embodiments, the level should be as low as possible to avoid interfering with the actual CPD echo signal. The expected maximum level of the actual CPD echo signal is about 20 dB below the carrier level of an upstream QAM signal (i.e., −20 dBc). As a result of computer simulations, it has been concluded that (for the first and third embodiments) the minimum level of the reference CPD signal should be about the same as the expected maximum level of the actual CPD echo signal (or −20 dBc). The typical upstream QAM signal level at the input of the remote PHY device is about +15 dBmV, so, in such case, a minimum level for the reference CPD signal would be about −5 dBmV. If a 30 dBc carrier-to-noise ratio (CNR) is assumed in the upstream, then the noise floor is about −15 dBmV. Thus, the minimum level of the reference CPD signal is about 10 dB above noise, and the preferred range is about 10-20 dB above noise.

Also, it is desirable to detect the CPD echo signal within the range of about −20 dBc to about −60 dBc. Thus, the dynamic range of the CPD detection process should be about 40 dB or more. This dynamic range should be achievable with a reference CPD signal of at least −5 dBmV and an autocorrelation accumulation time of 800 milliseconds. Note again, in the case of the second embodiment (FIG. 14), the level of the reference CPD signal should be increased (without concern of channel interference) in order to provide higher fidelity reference samples.

Figure 18:
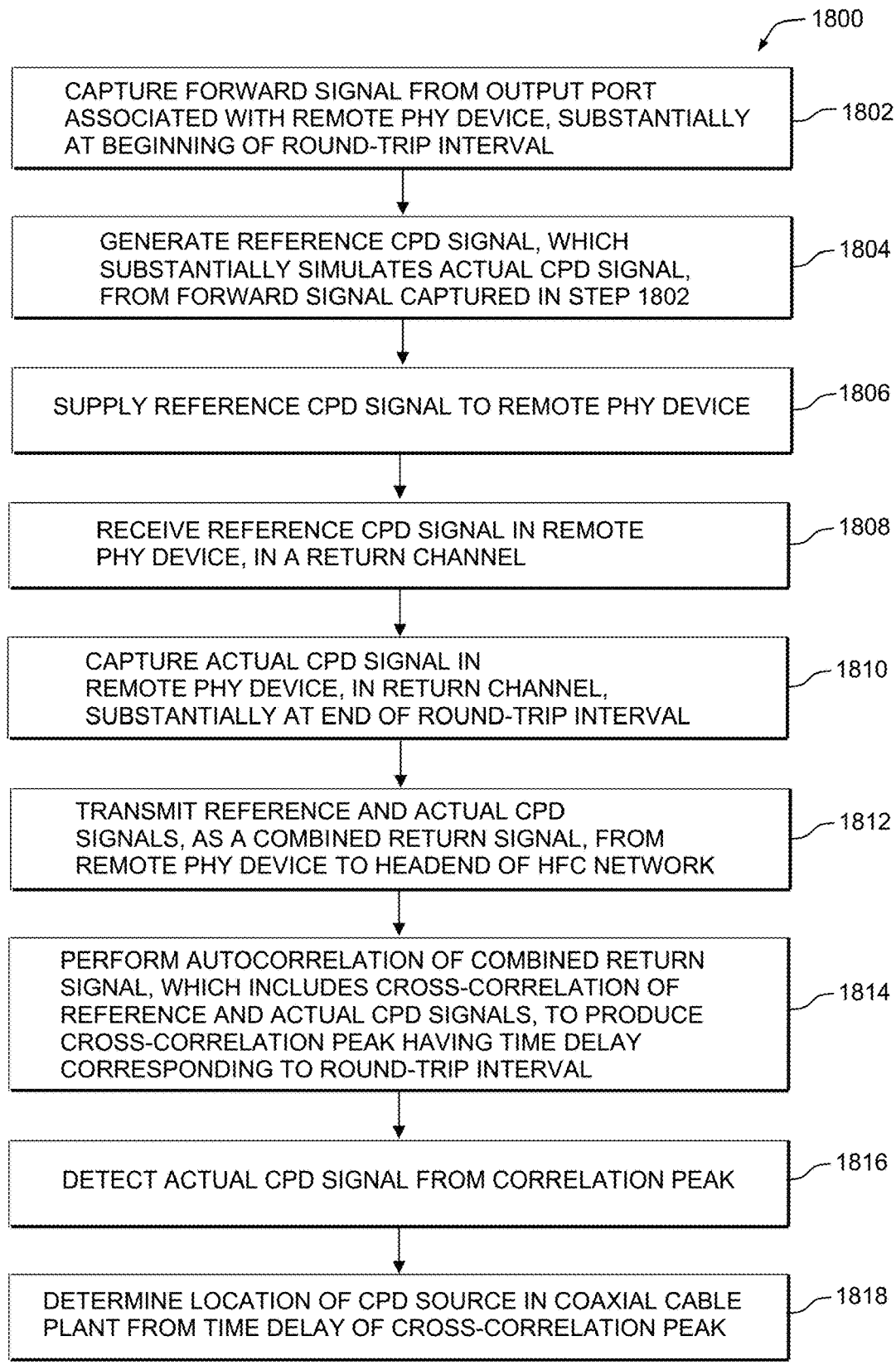
FIG. 18 is a flow diagram of a method of the present invention enabling synchronous capture of a forward signal and an actual CPD echo signal, and the correlation detection of the actual CPD echo signal and the location of the CPD source.

Referring now to FIG. 18, a flow diagram of a method 1800 of the invention is shown. Method 1800 enables synchronous capture of a forward signal and a related actual CPD signal, at a remote PHY device, for the purpose of detecting CPD and locating its source. The remote PHY device is coupled to and delivers the forward signal to a coaxial cable plant of an HFC network. The actual CPD signal is generated by an interaction between the forward signal and a CPD source in the coaxial cable plant. The forward signal propagates from the remote PHY device to the CPD source and the actual CPD signal propagates from the CPD source to the remote PHY device, all within a round-trip interval. In a first step 1802 of method 1800, the forward signal is captured from an output port associated with the remote PHY device, substantially at the beginning of the round-trip interval. In a second step 1804, a reference CPD signal, which substantially simulates the actual CPD signal, is generated from the forward signal captured in step 1802. In a third step 1806, the reference CPD signal is supplied to the remote PHY device. In a fourth step 1808, the reference CPD signal is received in the remote PHY device in a return channel. In a fifth step 1810, the actual CPD signal is captured in the remote PHY device, in the return channel, substantially at the end of the round-trip interval. The reference and actual CPD signals are processed as a combined return signal.

In a sixth step 1812 of method 1800, the combined return signal is transmitted from the remote PHY device to a headend of the HFC network. In a seventh step 1814, at the headend or a device communicating with the headend (e.g., CPD core), a cross-correlation of the reference and actual CPD signals of the combined return signal is performed, to produce a correlation peak having a time delay corresponding to the round-trip interval. Step 1814 is preferably performed by first computing the autocorrelation function of the combined return signal and then extracting the cross-correlation term(s) from the function. In an eighth step 1816, the actual CPD signal is detected from the correlation peak. Lastly, in a ninth step 1818, a location of the CPD source in the coaxial cable plant is determined from the time delay of the correlation peak.

Figure 19:
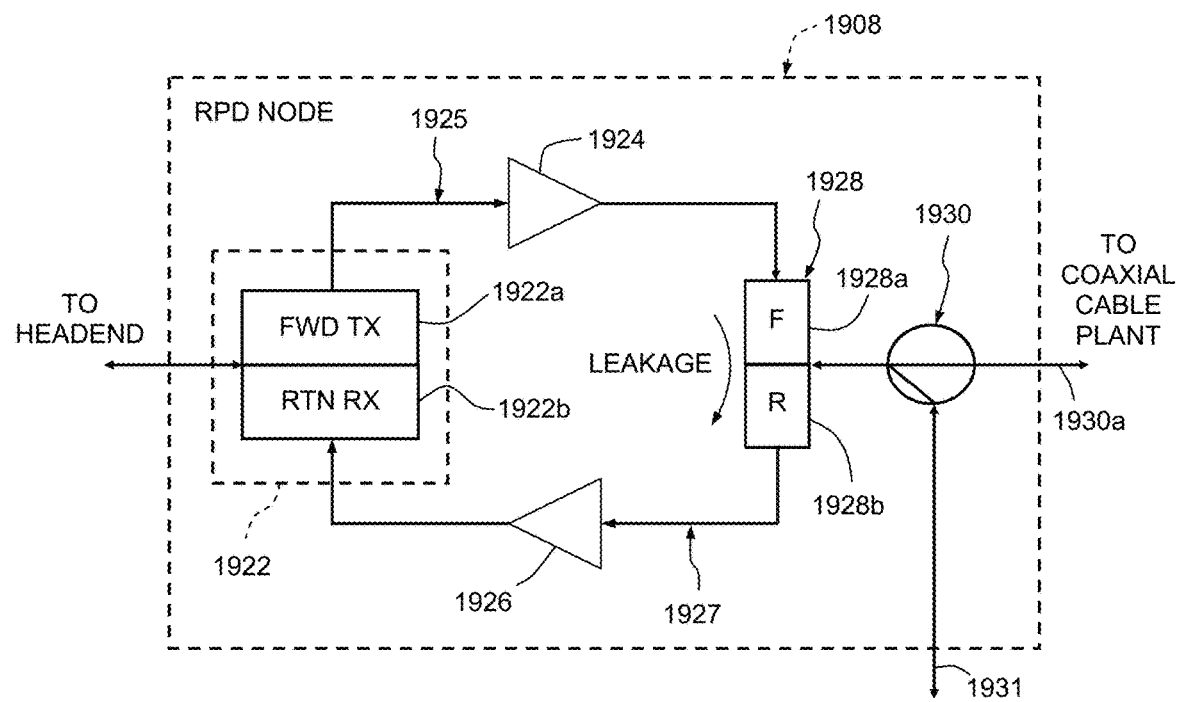
FIG. 19 is a block diagram of a remote PHY device showing remote PHY transmitter and receiver chipsets and a generalized diplexer component, and illustrating a leakage phenomenon which forms the basis of a fourth embodiment of the present invention.

Referring now to FIG. 19, there is shown a block diagram of a remote PHY node 1908, which is to be discussed in connection with a fourth embodiment of the present invention. Node 1908 has a similar structure as remote PHY node 108 in FIG. 1, except as herein described. In FIG. 19, like reference numerals refer to like parts with respect to FIG. 1. Node 1908 contains a chipset unit 1922, a forward amplifier 1924, a return amplifier 1926, a diplexer 1928, and an output tap 1930 containing an output test port 1931. Chipset unit 1922 includes a forward signal transmitter chipset 1922*a* and a return signal receiver chipset 1922*b*. Chipset 1992*a* contains downstream QAM modulators and chipset 1922*b* contains upstream QAM demodulators, and both contain logic to connect to and communicate with a CCAP core at a headend. Diplexer 1928 includes a forward leg 1928*a* and a return leg 1928*b*. A physical forward path 1925 is defined between forward signal transmitter chipset 1922*a* and forward leg 1928*a*. A physical return path 1927 is defined between return signal receiver chipset 1922*b* and return leg 1928*b*. A downstream or forward signal produced in transmitter chipset 1922*a* is amplified by forward amp 1924, passes through forward leg 1928*a* of diplexer 1928, passes through tap 1930, exits node 1908 at an RF output port 1930*a*, and then travels to a coaxial cable plant (not shown). Upstream or return signals from the coaxial cable plant travel to and are received by node 1908. The return signals pass through return leg 1928*b* of diplexer 1928, are amplified by return amp 1926, received by receiver chipset 1922*b* for demodulation and down-conversion, and then communicated to a CCAP core at a headend of an HFC network. Output test port 1931 is terminated and not used in the fourth embodiment. An advantage of the fourth embodiment is that a CPD generator unit is not used to accomplish synchronous capture of the forward signal.

Signal isolation between forward leg 1928*a* and return leg 1928*b* is not perfect; in fact, it can be as low as 40 dB of attenuation. Thus, inevitably, there is leakage of the forward signal from forward leg 1928*a* to return leg 1928*b* (see Leakage arrow in FIG. 19). A leaked portion of the forward signal travels from return leg 1928*b*, over physical return path 1927, to return signal receiver 1922*b*. The leaked portion of the forward signal (plus system noise at forward signal frequencies) is amplified by return amplifier 1926. This phenomenon of forward signal leakage is the basis of the fourth embodiment, in that the leakage provides access to the forward signal (at least a portion of its spectrum) at receiver 1922*b* for synchronous capture along with actual CPD echo signals. In accordance with the fourth embodiment, receiver 1922*b* is operated in such a manner as to take advantage of (i.e., capture) the available leaked portion of the forward signal. Thus, there is no need to capture the forward signal in a CPD generator device coupled to output test port 1931.

In order to take advantage of the leaked forward signal, return signal receiver 1922*b* should be flexible in its operating parameters. The bandwidth over which it can capture signals ("capturing bandwidth") should be adjustable and the center frequency of the capturing bandwidth should also be adjustable. By opening or enlarging the capturing bandwidth and centering the bandwidth at a suitable frequency, a sufficient amount of the forward signal spectrum (along with the return signal spectrum) can be captured (sufficient enough for later generating a reference CPD signal to be used in cross-correlation detection and location of CPD). The frequency spectrum of the forward signal is referred to herein as the forward signal spectrum (i.e., a band of frequencies). A suitable chipset for receiver 1922*b* is the model BCM31442 chip, manufactured by Broadcom, Inc., San Jose, Calif. The BCM31442 chip has a frequency span or maximum capturing bandwidth of 409.6 MHz with selectable center frequencies of 128 MHz, 179.2 MHz, 230.4 MHz, or 281.6 MHz. Thus, if receiver 1922*b* is configured to have a center frequency of 230.4 MHz and a capturing bandwidth of 409.6 MHz, receiver 1922*b* will be able to capture, for example, a return signal from 25 (about) to 85 MHz and a forward signal from 100 to 435.2 MHz. Thus, the range of frequencies of the forward signal spectrum that can be captured by receiver 1922*b* is 335.2 MHz (435.2–100), which is more than enough to generate a high fidelity reference CPD signal for CPD detection. Both the center frequency and the frequency span can be programmable from a CPD core (e.g., CPD core 118 in FIG. 1) via a CCAP core (e.g., CCAP core 104 in FIG. 1). The captured spectrum data is sent from receiver 1922*b* to the CCAP core and then to the CPD core for generation of the reference CPD signal and cross-correlation detection with the actual CPD echo signal (captured as part of the return signals in the return spectrum).

Figure 20:
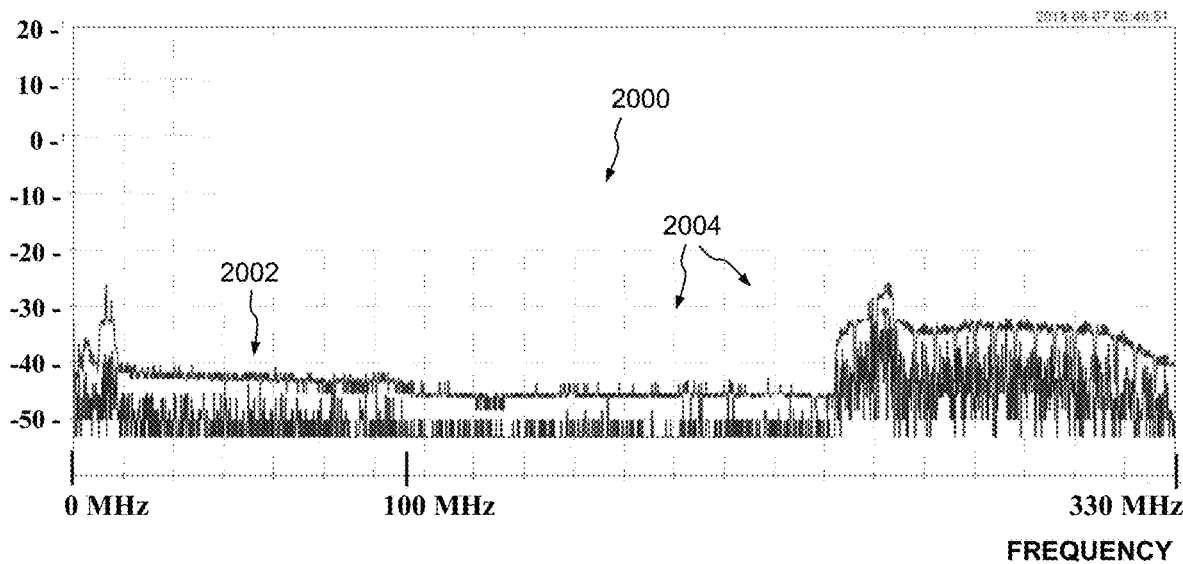
FIG. 20 is a spectrum captured by the remote PHY receiver chipset, where the spectrum encompasses the return spectrum of the return signals in a network (including actual CPD echo signal) and some of the forward spectrum from a leaked portion of the forward signal.

FIG. 20 is an image of a spectrum 2000 captured by receiver 1922*b*. Spectrum 2000 is a plot of signal level in dBmV versus frequency in MHz. In this example, the settings in receiver 1922*b* included a center frequency of 128 MHz and a span of 409.6 MHz. However, because of the location of the center frequency, the captured bandwidth (and capturing bandwidth) is only 330 MHz. The captured bandwidth (spectrum 2000) includes an entire return spectrum 2002, from 5 to 85 MHz, and a range of frequencies 2004 of the forward spectrum, from 100 to 330 MHz (about). Range of frequencies 2004 is present in spectrum 2000 due to the limited isolation in diplexer 1928 (leakage). As shown, the signals in range 2004 have levels as high as plus-or-minus −30 dBmV, which is sufficient to generate the reference CPD signal for cross-correlation detection.

The duration of the signals captured by receiver 1922*b* is 10 or 20 microseconds. In the case of 20 microseconds, the frequency span may need to be reduced from 409.6 MHz to 208.4 MHz. This will result in a reduced range of frequencies that can be captured of the forward signal spectrum. However, the reduced range will be sufficient to produce a suitable reference CPD signal. One test showed that only 8 QAM channels (48 MHz) produced a suitable reference CPD signal for detection of CPD with an adequate signal-to-noise ratio. Due to the limitation on the signal duration, the range of distances (or time distances) of possible CPD sources (from the remote PHY node) may be limited to 8 microseconds (16 microseconds round-trip interval) or approximately 1000 meters (2000 round-trip distance).

Receiver 1922*b* (and the BCM31442 chip) allows the spectrum data to be captured as: (1) samples of a Fast Fourier Transform (FFT) processor (generated after baseband down-conversion of the signal) in receiver 1922*b*; or (2) the direct output of an analog-to-digital converter (ADC) inside receiver 1922*b*. In case (1), the bit rate the FFT (4K) is approximately 100 Mbps according measured results. In case of a quadrature I/Q data, the traffic will be twice this, or approximately 200 Mbps. This data traffic is only about twice the traffic generated in the other embodiments using the 5.12 MHz NDR channel; and, the data traffic in the fourth embodiment will only be required for a short period of time (e.g., a few seconds). Thus, the increased data traffic should not impact normal operation of the network system.

Referring again to FIG. 19, diplexer 1928 is not limited to a diplex filter embodiment, as is diplex filter 128 in FIG. 1. Diplexer 1928 symbolizes any combining and splitting network (e.g., an impedance bridge, a signal splitter, or diplex filter). In further network systems, employing full duplex operation, diplexer 1928 will be a signal splitter. In current remote PHY devices, diplexer 1928 represents a diplex filter, where forward leg 1928a is a highpass filter leg and return leg 1928b is lowpass filter leg (as described with respect to diplex filter 128 in FIG. 1). The term "diplexer" as used in this specification and the claims is intended to encompass any such combining and splitting network (diplex filter, signal splitter, etc.).

The above-mentioned BCM31442 chip, by Broadcom, is an advanced DOCSIS® 3.1 dual-port cable network burst receiver that accepts upstream burst data in a frequency-agile time division multiple access (TDMA), synchronous code division multiple access (S-CDMA), or orthogonal frequency division multiple access (OFDMA) scheme. The chip integrates an analog front end, QAM (up to 4096 order)/OFDMA demodulators, FEC decoders, and a MAC/PHY interface. The analog front end performs analog-to-digital (A/D) conversion on RF inputs with a carrier frequency of up to 300 MHz; the integrated A/D converters support direct digital sampling of the entire 0 to 300 MHz reverse path. A digital quadrature down-mixer translates the input spectral center to baseband. The BCM31442 delivers the recovered data streams and accepts receiver control inputs through a receive interface linked to a MAC chip (in CCAP core). An on-chip FFT processor can analyze an RF spectrum with a selectable bandwidth and length; it enables advanced spectrum management of the entire 0 to 300 MHz upstream.

Forward signal transmitter 1922a may be a Broadcom model BCM3047 single port downstream modulator chip with support for 160 QAM narrowcast channels and additional support for six OFDM 192 MHz channels. The BCM3047 has an integrated 6.4 GHz DAC for direct digital synthesis up to 1.2 GHz. The BCM3047 is CCAP-compliant and supports DOCSIS® 1.0/1.1/2.0/3.0/3.1 specifications and SCTE/ITU-B standards. Each QAM downstream modulator in the chip supports programmable modulation formats up to 1024 QAM (per the C-DOCSIS standard). The chip also includes SCTE 55-1 and SCTE 55-2 out-of-band (OOB) channel modulators.

Figure 21:
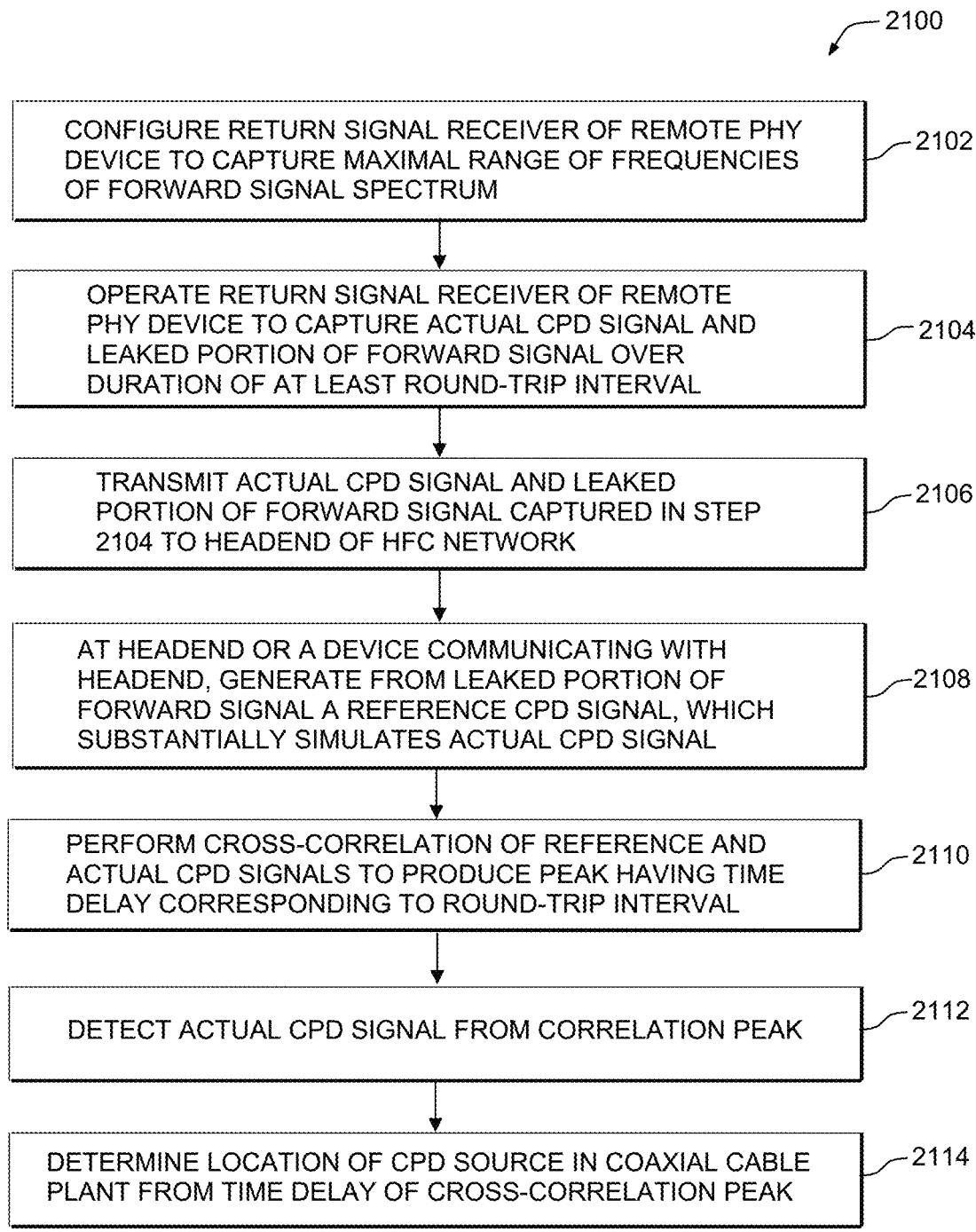
FIG. 21 is a flow diagram outlining a method of carrying out the fourth embodiment of the present invention.

Referring now to FIG. 21, a flow diagram of a method 2100 of the invention is shown (fourth embodiment). Method 2100 is a method of synchronous capture of a forward signal and a related actual common path distortion (CPD) signal at a remote physical layer (PHY) device, for the purpose of detecting CPD and locating its source. The remote PHY device is coupled between a headend and a coaxial cable plant of an HFC network and includes a forward signal transmitter, a return signal receiver, and a diplexer having forward and return legs. A physical forward path is defined between the forward signal transmitter and the forward leg, and a physical return path is defined between the return signal receiver and the return leg. The forward signal transmitter transmits the forward signal to the coaxial cable plant via the physical forward path and the forward leg of the diplexer. A portion of the forward signal leaks through to the return leg of the diplexer and travels over the physical return path to the return signal receiver. The actual CPD signal is generated by an interaction between the forward signal and a CPD source in the coaxial cable plant. The forward signal propagates from the remote PHY device to the CPD source and the actual CPD signal propagates from the CPD source to the remote PHY device all within a round-trip interval. Method 2100 comprises steps 2102 through 2114.

In a first step 2102, return signal receiver 1922b of remote PHY node 1908 is configured to capture a maximal range of frequencies of the forward signal spectrum. This may be accomplished by instructions from the CPD core delivered to the CCAP core and then delivered to receiver 1922b. In a second step 2104, receiver 1922b is operated to capture the actual CPD signal (in the return spectrum) and the leaked portion of the forward signal over a duration of at least the round-trip interval. In a third step 2106, the actual CPD signal and the leaked portion of the forward signal (captured in step 2104) is transmitted to the headend of the HFC network. For example, it is transmitted from receiver 1922b to the CCAP core and then to the CPD core. In a fourth step 2108, at the headend or at a device that communicates with the headend (e.g., CPD core), a reference CPD signal (which substantially simulates the actual CPD signal) is generated from the leaked portion of the forward signal. In a fifth step 2110, a cross-correlation of the reference and actual CPD signals is performed to produce a correlation peak having a time delay corresponding to the round-trip interval. In a sixth step 2112, the actual CPD signal is detected from the correlation peak. Finally, in a seventh step 2114, a location of the CPD source in the coaxial cable plant (relative to the remote PHY device) is determined from the time delay of the correlation peak.

The above-described functions of the invention may be implemented in hardware, firmware, software, or a combination of these. If in hardware, the functions may be implemented in an application specific integrated circuit (ASIC), digital signal processor (DSP), FPGA, micro-controller, microprocessor, programmable logic device, general purpose computer, special purpose computer, other electronic device, or a combination of these. If the functions are implemented in firmware or software, then they may be stored on computer-readable media. Computer-executable instructions may cause hardware to perform the functions of the invention. Such instructions include data structures, objects, programs, routines, or other program modules. Computer-readable media include, but are not limited to, random-access memory ("RAM), read-only memory ("ROM), programmable read-only memory ("PROM), erasable programmable read-only memory ("EPROM), electrically erasable programmable read-only memory ("EEPROM"), compact disk read-only memory ("CD-ROM), or other device or component capable of providing data or executable instructions. Certain claimed embodiments may be limited to the use of tangible, non-transitory computer-readable media, and the phrases "tangible computer-readable medium" and "non-transitory computer-readable medium" (or plural variations) used herein are intended to exclude transitory propagating signals per se.

While the preferred embodiments of the invention have been described herein, it should be understood that the invention is not so limited. Many modifications, equivalents and adaptations of the invention will become apparent to those skilled in the art without departing from the spirit and scope of the invention, as defined in the appended claims.

What is claimed is:

1. A method of detecting common path distortion (CPD) in a hybrid-fiber coax (HFC) network that includes a headend, a coaxial cable plant, and a remote physical layer (PHY) device coupled between the headend and the coaxial cable plant, the remote PHY device including a forward signal transmitter, a return signal receiver having an adjustable capturing bandwidth, a diplexer having forward and return legs, a forward path defined between the forward signal transmitter and the forward leg, and a return path defined between the return signal receiver and the return leg, the return signal receiver receiving a return signal from the coaxial cable plant via the return leg of the diplexer and the return path, the forward signal transmitter providing a forward signal to the coaxial cable plant via the forward path and the forward leg of the diplexer, a portion of the forward signal leaking through the return leg of the diplexer and traveling over the return path to the return signal receiver, the return signal containing an actual CPD signal generated by an interaction between the forward signal and a CPD source in the coaxial cable plant, the forward signal propagating from the remote PHY device to the CPD source and the actual CPD signal propagating from the CPD source to the remote PHY device all within a round-trip interval, said method comprising the steps of:
  (a) adjusting the capturing bandwidth of the return signal receiver of the remote PHY device to include both the return signal and a range of frequencies of the leaked forward signal;
  (b) operating the return signal receiver to synchronously capture the return signal and the range of frequencies of the leaked forward signal over a limited capture duration of at least the round-trip interval; and
  (c) detecting the actual CPD signal by processing the leaked forward and the return signals captured in step (b);
  transmitting the return and the leaked forward signals captured in step (b) to the headend of the HFC network; and wherein step (c) is performed at the headend or in a device communicating with the headend; and
wherein step (c) includes:
  (i) generating from the captured leaked forward signal a reference CPD signal that substantially simulates the actual CPD signal;
  (ii) performing a cross-correlation of the reference CPD signal and the captured return signal to produce a correlation peak associated with the actual CPD signal; and
  (iii) detecting the actual CPD signal from the correlation peak.

2. The method as recited in claim 1, wherein the capturing bandwidth of the return signal receiver is defined by a center frequency of a plurality of center frequencies, and wherein step (a) includes selecting one of the plurality of center frequencies as the center frequency of the capturing bandwidth.

3. The method as recited in claim 1, wherein step (a) includes adjusting the capturing bandwidth to about 409.6 MHz.

4. The method as recited in claim 1, wherein step (a) includes adjusting the capturing bandwidth to about 204.8 MHz.

5. The method as recited in claim 1, wherein the range of frequencies of the leaked forward signal captured in step (b) is not greater than about 335.2 MHz.

6. The method as recited in claim 1, wherein the range of frequencies of the leaked forward signal captured in step (b) is at least about 48 MHz.

7. The method as recited in claim 1, wherein the capture of the return and the leaked forward signals in step (b) is performed over a capture duration of about 10 microseconds.

8. The method as recited in claim 1, wherein the capture of the return and the leaked forward signals in step (b) is performed over a capture duration of about 20 microseconds.

9. The method as recited in claim 1, wherein the remote PHY device is located at an optical node of the HFC network.

10. The method as recited in claim 1, further comprising the step of programming the adjustment of the capturing bandwidth in step (a) from a device at the headend or a device communicating with the headend.

11. The method as recited in claim 10, wherein the device at the headend is a programmed computer processor associated with a Converged Cable Access Platform (CCAP) core.

12. A method of detecting common path distortion (CPD) in a hybrid-fiber coax (HFC) network that includes a headend, a coaxial cable plant, and a remote physical layer (PHY) device coupled between the headend and the coaxial cable plant, the remote PHY device including a forward signal transmitter, a return signal receiver having an adjustable capturing bandwidth, a diplexer having forward and return legs, a forward path defined between the forward signal transmitter and the forward leg, and a return path defined between the return signal receiver and the return leg, the return signal receiver receiving a return signal from the coaxial cable plant via the return leg of the diplexer and the return path, the forward signal transmitter providing a forward signal to the coaxial cable plant via the forward path and the forward leg of the diplexer, a portion of the forward signal leaking through the return leg of the diplexer and traveling over the return path to the return signal receiver, the return signal containing an actual CPD signal generated by an interaction between the forward signal and a CPD source in the coaxial cable plant, the forward signal propagating from the remote PHY device to the CPD source and the actual CPD signal propagating from the CPD source to the remote PHY device all within a round-trip interval, said method comprising the steps of:
  (a) adjusting the capturing bandwidth of the return signal receiver of the remote PHY device to include both the return signal and a range of frequencies of the leaked forward signal;
  (b) operating the return signal receiver to synchronously capture the return signal and the range of frequencies of the leaked forward signal over a limited capture duration of at least the round-trip interval; and
  (c) detecting the actual CPD signal by processing the leaked forward and the return signals captured in step (b);

programming the adjustment of the capturing bandwidth in step (a) from a device at the headend or a device communicating with the headend, wherein the device communicating with the headend is a programmed computer server; and wherein the server is programmed as a CPD core substantially devoted to the detection of CPD in the coaxial cable plant of the HFC network.

13. The method as recited in claim 12, wherein the capturing bandwidth of the return signal receiver is defined by a center frequency of a plurality of center frequencies, and wherein step (a) includes selecting one of the plurality of center frequencies as the center frequency of the capturing bandwidth.

14. The method as recited in claim 12, wherein step (a) includes adjusting the capturing bandwidth to about 409.6 MHz.

15. The method as recited in claim 12, wherein step (a) includes adjusting the capturing bandwidth to about 204.8 MHz.

16. The method as recited in claim 12, wherein the range of frequencies of the leaked forward signal captured in step (b) is not greater than about 335.2 MHz.

17. The method as recited in claim 12, wherein the range of frequencies of the leaked forward signal captured in step (b) is at least about 48 MHz.

18. The method as recited in claim 12, wherein the capture of the return and the leaked forward signals in step (b) is performed over a capture duration of about 10 microseconds.

19. The method as recited in claim 12, wherein the capture of the return and the leaked forward signals in step (b) is performed over a capture duration of about 20 microseconds.

20. The method as recited in claim 12, wherein the remote PHY device is located at an optical node of the HFC network.

21. The method as recited in claim 12, wherein the device at the headend is a programmed computer processor associated with a Converged Cable Access Platform (CCAP) core.

* * * * *